(12) United States Patent
Ganong et al.

(10) Patent No.: US 8,750,574 B2
(45) Date of Patent: Jun. 10, 2014

(54) METHOD, SYSTEM, AND COMPUTER PROGRAM FOR IDENTIFICATION AND SHARING OF DIGITAL IMAGES WITH FACE SIGNATURES

(75) Inventors: Ray Ganong, Oakville (CA); Donald Waugh, Oakville (CA); Yong Man Ro, Seoul (KR); Konstantinos Plataniotis, Toronto (CA); Chris Studholme, Toronto (CA)

(73) Assignee: Applied Recognition Inc., Burlington, Ontario (CA)

( * ) Notice: Subject to any disclaimer, the term of this patent is extended or adjusted under 35 U.S.C. 154(b) by 906 days.

(21) Appl. No.: 12/811,240

(22) PCT Filed: Dec. 30, 2008

(86) PCT No.: PCT/CA2008/002276
§ 371 (c)(1),
(2), (4) Date: Jun. 30, 2010

(87) PCT Pub. No.: WO2009/082814
PCT Pub. Date: Jul. 9, 2009

(65) Prior Publication Data
US 2010/0287053 A1    Nov. 11, 2010

Related U.S. Application Data

(60) Provisional application No. 61/017,895, filed on Dec. 31, 2007.

(51) Int. Cl.
*G06K 9/00* (2006.01)

(52) U.S. Cl.
USPC .......................................................... 382/115

(58) Field of Classification Search
CPC .......... H04N 5/23219; G06K 9/00221; G06K 9/00248; G06K 9/00295; G06T 2207/30201
USPC .................................................. 382/115, 117
See application file for complete search history.

(56) References Cited

U.S. PATENT DOCUMENTS

| | | | | |
|---|---|---|---|---|
| 5,835,616 A | * | 11/1998 | Lobo et al. | 382/118 |
| 5,850,470 A | * | 12/1998 | Kung et al. | 382/157 |
| 5,982,912 A | * | 11/1999 | Fukui et al. | 382/118 |
| 6,134,339 A | * | 10/2000 | Luo | 382/115 |
| 6,246,779 B1 | * | 6/2001 | Fukui et al. | 382/103 |
| 6,301,370 B1 | * | 10/2001 | Steffens et al. | 382/103 |
| 6,697,502 B2 | * | 2/2004 | Luo | 382/115 |
| 6,728,401 B1 | * | 4/2004 | Hardeberg | 382/167 |

(Continued)

FOREIGN PATENT DOCUMENTS

EP    1388802 A2 * 2/2004 ............... G06K 9/00

*Primary Examiner* — Gandhi Thirugnanam
(74) *Attorney, Agent, or Firm* — Norton Rose Fulbright Canada LLP

(57) ABSTRACT

The present invention solves the problem of automatically recognizing multiple known faces in photos or videos on a local computer storage device (on a home computer). It further allows for sophisticated organization and presentation of the photos or videos based on the graphical selection of known faces (by selecting thumbnail images of people). It also solves the problem of sharing or distributing photos or videos in an automated fashion between 'friends' who are also using the same software that enables the invention. It further solves the problem of allowing a user of the invention to review the results of the automatic face detection, eye detection, and face recognition methods and to correct any errors resulting from the automated process.

10 Claims, 20 Drawing Sheets

(56) References Cited

U.S. PATENT DOCUMENTS

| | | | |
|---|---|---|---|
| 7,003,135 B2* | 2/2006 | Hsieh et al. | 382/103 |
| 7,804,982 B2* | 9/2010 | Howard et al. | 382/115 |
| 8,121,408 B2* | 2/2012 | Omori | 382/173 |
| 8,165,352 B1* | 4/2012 | Mohanty et al. | 382/115 |
| 8,326,000 B2* | 12/2012 | Jung et al. | 382/118 |
| 8,416,312 B2* | 4/2013 | Matsunaga | 348/222.1 |
| 8,649,604 B2* | 2/2014 | Steinberg et al. | 382/190 |
| 2002/0191818 A1* | 12/2002 | Matsuo et al. | 382/118 |
| 2003/0039380 A1* | 2/2003 | Sukegawa et al. | 382/118 |
| 2003/0053663 A1* | 3/2003 | Chen et al. | 382/117 |
| 2003/0063669 A1* | 4/2003 | Lee et al. | 375/240.08 |
| 2003/0103652 A1* | 6/2003 | Lee et al. | 382/118 |
| 2003/0133599 A1* | 7/2003 | Tian et al. | 382/118 |
| 2003/0198368 A1* | 10/2003 | Kee | 382/118 |
| 2004/0081338 A1* | 4/2004 | Takenaka | 382/118 |
| 2004/0109584 A1* | 6/2004 | Lestideau | 382/103 |
| 2004/0125991 A1* | 7/2004 | Yokoi | 382/115 |
| 2004/0190758 A1* | 9/2004 | Doi et al. | 382/115 |
| 2005/0031173 A1* | 2/2005 | Hwang | 382/118 |
| 2005/0094849 A1* | 5/2005 | Sung et al. | 382/103 |
| 2005/0100195 A1* | 5/2005 | Li | 382/118 |
| 2005/0117802 A1* | 6/2005 | Yonaha et al. | 382/173 |
| 2005/0141766 A1* | 6/2005 | Nagahashi et al. | 382/190 |
| 2005/0180627 A1* | 8/2005 | Yang et al. | 382/159 |
| 2005/0220347 A1* | 10/2005 | Enomoto et al. | 382/190 |
| 2005/0251015 A1* | 11/2005 | Takikawa et al. | 600/407 |
| 2005/0265603 A1* | 12/2005 | Porter et al. | 382/190 |
| 2006/0050933 A1* | 3/2006 | Adam et al. | 382/118 |
| 2006/0133672 A1* | 6/2006 | Li | 382/190 |
| 2006/0222215 A1* | 10/2006 | Jung et al. | 382/117 |
| 2007/0206834 A1* | 9/2007 | Shinkai et al. | 382/103 |
| 2007/0211925 A1* | 9/2007 | Aoki et al. | 382/118 |
| 2008/0212849 A1* | 9/2008 | Gao | 382/118 |
| 2008/0317379 A1* | 12/2008 | Steinberg et al. | 382/275 |
| 2009/0185784 A1* | 7/2009 | Hiroike et al. | 386/69 |
| 2009/0324018 A1* | 12/2009 | Tell | 382/103 |
| 2010/0061631 A1* | 3/2010 | Omori | 382/170 |
| 2010/0245614 A1* | 9/2010 | Matsunaga | 348/222.1 |
| 2010/0272363 A1* | 10/2010 | Steinberg et al. | 382/190 |
| 2010/0287053 A1* | 11/2010 | Ganong et al. | 705/14.66 |
| 2011/0063108 A1* | 3/2011 | Aonuma et al. | 340/540 |

* cited by examiner

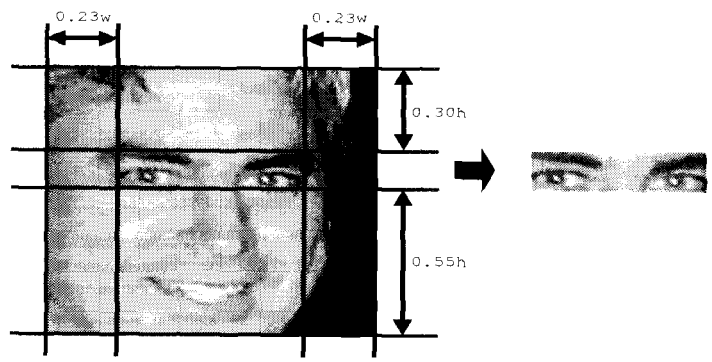
Figure 14A
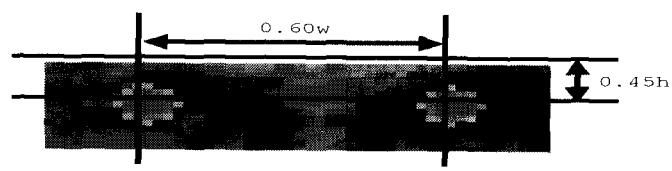
Figure 14B
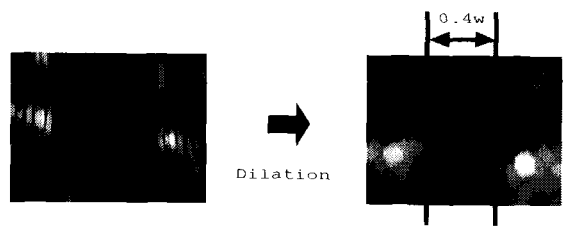
Figure 14C
Fig. 14

METHOD, SYSTEM, AND COMPUTER PROGRAM FOR IDENTIFICATION AND SHARING OF DIGITAL IMAGES WITH FACE SIGNATURES

FIELD OF THE INVENTION

The present invention relates to distribution of images to targeted individuals. More particularly, the present invention relates to face detection and face recognition in digital images, and distribution of the images to individuals appearing in the images using social network services and peer to peer networks.

BACKGROUND OF THE INVENTION

Social networks presently exist as a means to connect individuals using a website. The following definition exists in the PCMAG.COM™ encyclopedia for "social network":
   An association of people drawn together by family, work or hobby. The term was first coined by Professor J. A. Barnes in the 1950s, who defined the size of a social network as a group of about 100 to 150 people.
The following definition exists in the PCMAG.COM™ encyclopedia for "social network site":
   A Web site that provides a virtual community for people interested in a particular subject or just to "hang out" together. Members communicate by voice, chat, instant message, videoconference and blogs, and the service typically provides a way for members to contact friends of other members. Such sites may also serve as a vehicle for meeting in person. The "social networking site" is the 21st century term for "virtual community," a group of people who use the Internet to communicate with each other about anything and everything.
   Friendster (www.friendster.com) was the first social networking site, which was introduced in 2002 and followed by MySpace (www.myspace.com) a year later. Started by two friends, MySpace became extremely popular, and its parent company, Intermix, was acquired by News Corporation for $580 million two years after MySpace was launched.
   Facebook (www.facebook.com) came out in 2004 initially targeting college students, but later welcoming everyone. Following Facebook were TagWorld (www.tagworld.com) and Tagged (www.tagged.com). TagWorld introduced tools for creating more personalized Web pages, and Tagged introduced the concept of building tag teams for teens with like interests.
   Social networking sites compete for attention much like the first Web portals when the Internet exploded onto the scene in the mid-1990s. Many variations are expected.

Many social network sites allow users to upload and share photos. Some also incorporate a feature for tagging photos to identify the names of people (faces) in the photos (FACEBOOK™, for example, provides this feature). Based on user surveys the majority of respondents state that the tagging effort is manual and very time consuming. Also, for privacy reasons, many users do not upload all of their digital photos to the sharing website. It is also very time consuming and bandwidth intensive to upload thousands of photos. So while a user of a social network site may have 10,000 digital photos on their local computer, they only upload one or two hundred to share with their friends. This is based on user surveys conducted by Applied Recognition Inc. in September 2007.

There are also websites that allow registered users to upload digital photos and digital video and store them on a website for sharing purposes. These are dedicated to this purpose. Examples of these sites include FLICKR™ and PHOTOBUCKET™. The drawback with these sites is that all tagging of photos to identify friends is manual and time consuming; PHOTOBUCKET™ does not allow people tagging in a photo. With FLICKR™, if an average photo contains two people, then it may take 10-15 seconds per photo to tag the people. When that time is multiplied by 100 or 1000, it becomes too time-consuming and the average person just will not perform tagging.

Rapid growth in photo-taking devices is occurring today with the incorporation of digital cameras in most modern cell phones. In fact, more cameras are sold via cell phones today than all dedicated digital cameras combined. This is causing a proliferation in the number of digital images that are uploaded and stored on home computers. Because the average number of digital images exceeds 1000 based on our surveys, the effort is too great to manually tag and properly organize the images for the majority of people.

One company, RIYA™ (www.riya.com), created a product that is web-based for identifying faces in digital photos. This product involved the download of a software module for identifying faces in photos on the user's local computer before uploading these photos to the remote RIYA™ web-based server where the faces were compared with other faces to find matches. This product is a prototype and as such has no automatic photo sharing features based on recognition. It also has no features for enabling the user to correct the inevitable errors that occur in any automated face detection and recognition method.

SUMMARY OF THE INVENTION

In one aspect of the present invention, a method for recognizing one or more faces in a digital image is provided, the method characterized by: (a) generating one or more face coordinates corresponding to one or more candidate regions for one or more faces; (b) generating eye coordinates based on the face coordinates; (c) detecting each face using one or more projection images defined by the face coordinates and the eye coordinates; and (d) comparing each projection image with one or more known projection images, wherein a similarity threshold is provided for defining a best match between the projection image and the known projection images.

In another aspect of the present invention, a method for sharing a digital image depicting one or more faces is provided, the method characterized by: (a) linking a plurality of computer terminals to a computer network, each computer terminal associated with an individual; (b) linking the digital image to at least one of the computer terminals; (c) enabling at least one of the computer terminals to initiate a face recognition routine on the digital image, the face recognition routine producing a list of one or more persons whose faces are depicted in the digital image, at least one of the persons being one of the individuals; and (d) enabling at least one of the computer terminals to initiate a sharing routine for disseminating the digital image to the computer terminals associated with the one or more persons.

In yet another aspect of the present invention, a method for providing secure targeted advertising is provided, the method characterized by: (a) tracking one or more demographic properties associated with an individual registered to a computer program; (b) retrieving from a first source a list of advertising pointers associated with one or more advertisements targeted based on the one or more demographic properties; (c) retrieving from a second source the one or more advertisements; (d)

deleting the one or more demographic properties from the first source; and (e) presenting the advertisements to the individual.

In a further aspect of the present invention, a system for recognizing one or more faces in a digital image is provided, the system characterized by: (a) one or more face coordinates corresponding to one or more candidate regions for one or more faces; (b) eye coordinates generated based on the face coordinates; (c) one or more projection images defined by the face coordinates and the eye coordinates; and (d) a similarity threshold for defining a best match between each projection image and one or more known projection images, the best match determining an identity corresponding to each of the one or more faces.

In a still further aspect of the present invention, a system for sharing a digital image depicting one or more faces is provided, the system characterized by: (a) a plurality of computer terminals linked to a computer network, each computer terminal associated with an individual; (b) a digital image operable to be linked to at least one of the computer terminals; (c) a face recognition routine operable to be initiated by at least one of the computer terminals, the face recognition routine producing a list of one or more persons whose faces are depicted in the digital image, at least one of the persons being one of the individuals; and (d) a sharing routine operable to be initiated by at least one of the computer terminals, the sharing routine disseminating the digital image to the computer terminals associated with the one or more persons.

In yet a further aspect of the present invention, a system for providing secure targeted advertising is provided, the system characterized by: (a) one or more demographic properties associated with an individual registered to a computer program; (b) a first source operable to provide a list of advertising pointers associated with one or more advertisements targeted based on the one or more demographic properties; (c) a second source operable to provide the one or more advertisements; (d) a means for deleting the one or more demographic properties from the first source; and (e) a means for presenting the advertisements to the individual.

In a further still aspect of the present invention, a computer program product for recognizing one or more faces in a digital image is provided, the computer program product characterized by: (a) a computer readable medium including software instructions; and (b) the software instructions for enabling the computer to perform predetermined operations, the predetermined operations including the steps of: (i) generating one or more face coordinates corresponding to one or more candidate regions for one or more faces; (ii) generating eye coordinates based on the face coordinates; (iii) detecting each face using one or more projection images defined by the face coordinates and the eye coordinates; and (iv) comparing each projection image with one or more known projection images, wherein a similarity threshold is provided for defining a best match between the projection image and the known projection images.

In another aspect of the present invention, a computer program product for sharing a digital image depicting one or more faces is provided, the computer program product characterized by: (a) a computer readable medium including software instructions; and (b) the software instructions for enabling the computer to perform predetermined operations, the predetermined operations including the steps of: (i) linking a plurality of computer terminals to a computer network, each computer terminal associated with an individual; (ii) linking the digital image to at least one of the computer terminals; (iii) enabling at least one of the computer terminals to initiate a face recognition routine on the digital image, the face recognition routine producing a list of one or more persons whose faces are depicted in the digital image, at least one of the persons being one of the individuals; and (iv) enabling at least one of the computer terminals to initiate a sharing routine for disseminating the digital image to the computer terminals associated with the one or more persons.

In yet another aspect of the present invention, a computer program product for providing secure targeted advertising is provided, the computer program product characterized by: (a) a computer readable medium including software instructions; and (b) the software instructions for enabling the computer to perform predetermined operations, the predetermined operations including the steps of: (i) tracking one or more demographic properties associated with an individual registered to a computer program; (ii) retrieving from a first source a list of advertising pointers associated with one or more advertisements targeted based on the one or more demographic properties; (iii) retrieving from a second source the one or more advertisements; (iv) deleting the one or more demographic properties from the first source; and (v) presenting the advertisements to the individual.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

BRIEF DESCRIPTION OF DRAWINGS

FIG. 14 illustrates a method of isolating eyes in a photo.

DETAILED DESCRIPTION

Overview

The present invention, in one aspect thereof, provides a networked computer architecture enabling the automatic distribution of images relating to a plurality of individuals operating computer systems on the network.

The present invention, in another aspect thereof, provides a computer program operable to enable each of the individuals to interface with the networked computer architecture herein provided for sharing information including images. The computer program enables the individuals to upload images including images having depictions of the faces of one or more persons. The computer program may perform a face detection technique to detect the one or more faces in the image, which may result in the generation of one or more face signatures, each face signature corresponding to one of the faces. The computer program may then access a database, wherein the database links face signatures with a list of known persons, each known person being associated with one or more face signatures. Each detected face signature may be provided to the individual as associated to the corresponding known person, or where the face signature is not associated with any known person, that information can be provided by the individual. The individual may be provided a means to confirm the association between a face signature and a known person.

The present invention, in yet another aspect thereof, provides a novel method for generating face signatures based on faces depicted in images. Further provided is a means for reducing error rates in associating recognized face signatures with one or more face signatures linked to a database.

The present invention, in a further aspect thereof, enables the automatic selective distribution of images depicting faces. If the faces detected in the images are associated with a person that interfaces with the networked computer architecture herein provided, the computer program herein provided may automatically transmit the image to the person's computer for presentation to the person. It should be noted that the terms "photo" and "image" are used interchangeably herein.

The present invention, in a further still aspect thereof, provides a novel advertising method that is operable with the networked computer architecture herein provided.

Networked Computer Architecture

Figure 1:
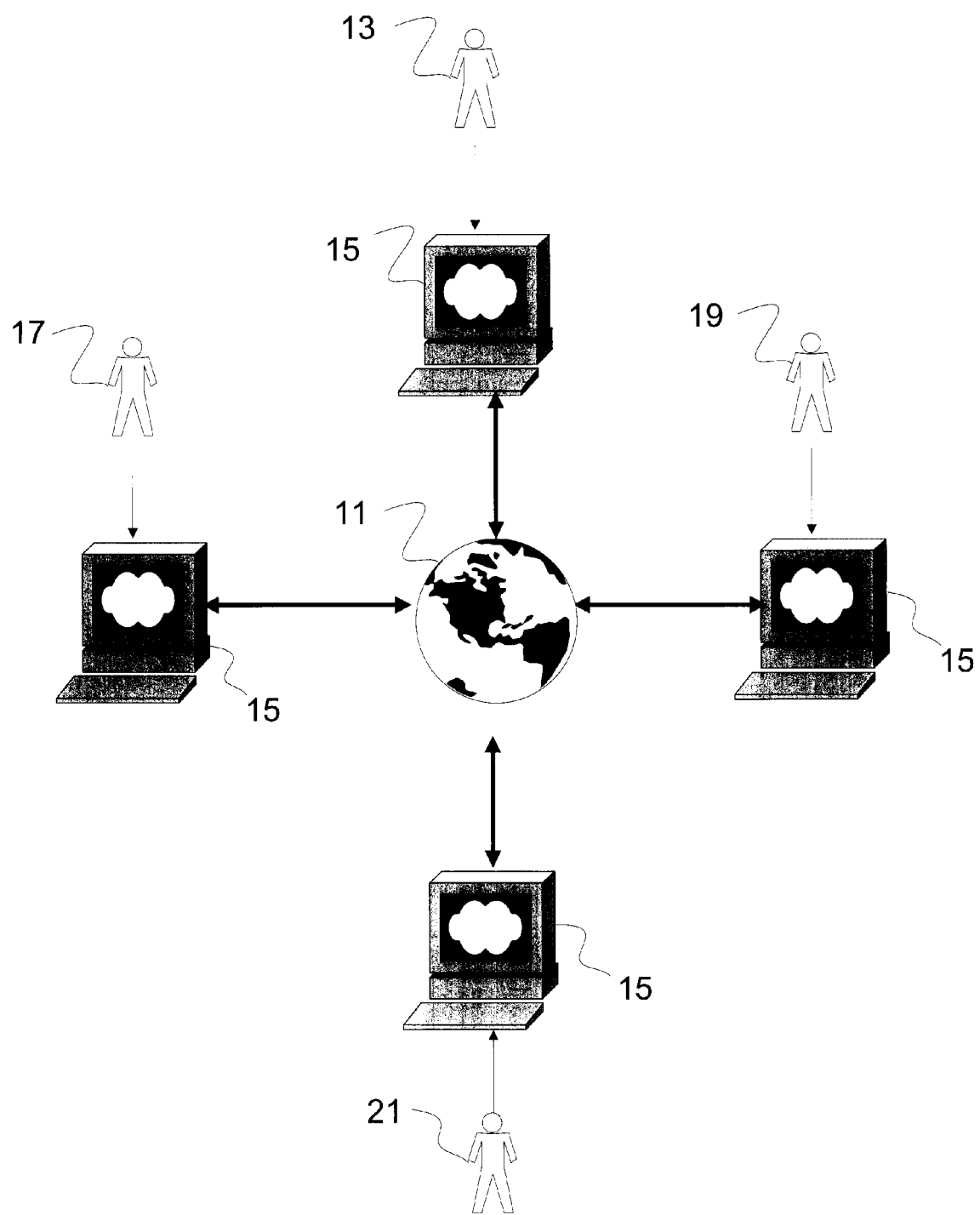
FIG. 1 illustrates a particular embodiment of the system of the present invention incorporating a social network service to perform targeted distribution of photos.

The present invention, in one aspect thereof, provides a networked computer architecture enabling the automatic distribution of images relating to a plurality of individuals operating computer systems on the network. FIG. 1 illustrates an example implementation of the networked computer architecture of the present invention. A plurality of individuals may each connect to the Internet (11) through computer terminals operable to access the Internet (11). The Internet (11) connection enables the transmission and reception of digital data from Internet connected devices, each of which may be operable as provided below.

Figure 15:
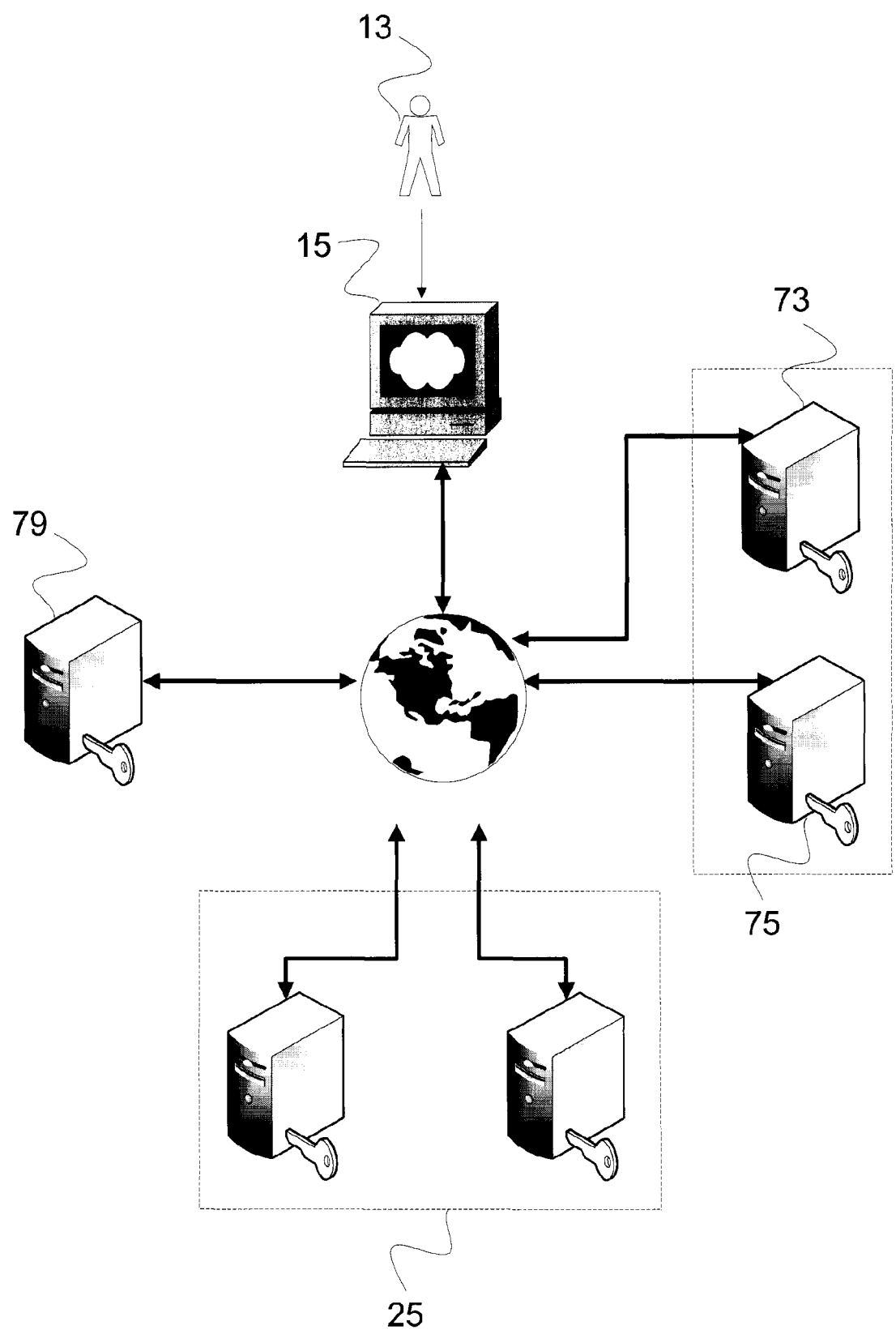
FIG. 15 illustrates an example configuration of the system of the present invention.

The present invention, in another aspect thereof, provides a computer program operable to enable each of the individuals to interface with the networked computer architecture herein provided. FIG. 15 illustrates an example configuration of the system of the present invention. The user (13) of the invention may register, download, and install the computer program to its computer system (15).

The computer program may, in one aspect thereof, allow the user (13) to invite and establish relationships with other users of the invention. The computer program may, in another aspect thereof, request ads from a set of advertising web servers (23) that deliver ads to the computer program for display to the user (13) on various portions of a graphical user interface ("GUI"). The computer program may, in yet another aspect thereof, transmit photos and metadata related to those photos to other users or to third-party websites (25) such as FLICKR™ and FACEBOOK™. These third-party websites (25) may encourage the use of their websites by publishing application programming interfaces (API's) to enable connection from client software or other web-based applications to their service.

The components of the computer program enabling implementation of the present invention may include:

A processing engine that may run as a background process on the operating system. It may scan for new digital photos that the user has uploaded or copied to the specified folders on the local and/or a remote computer that are being monitored for photos, or it may automatically detect new photos when removable media, such as a memory card, is inserted into the computer. When a new photo is detected the face detection, eye detection and face recognition steps may be performed, as described more fully below. The results may be stored in a database such as the database described more fully below. It should be noted that the processing engine could be executed on a remote computer, such as where the computer program of the present invention is provided as a service, which may use the software-as-a-service model.

A GUI that may provide a user with the ability to navigate photos, train the application by identifying known persons, edit and correct the automatic results of the engine, create and modify albums based on search criteria, add peer group members, and send albums to third party websites, each such action described more fully below.

A database (such as a SQL database, for example) that may be located on a user's computer, and may contain the results of the face detection, eye detection and face recognition steps described below. The database may also contain metadata for photos and people as well as relationships between known persons and the associated face images.

Figure 21:
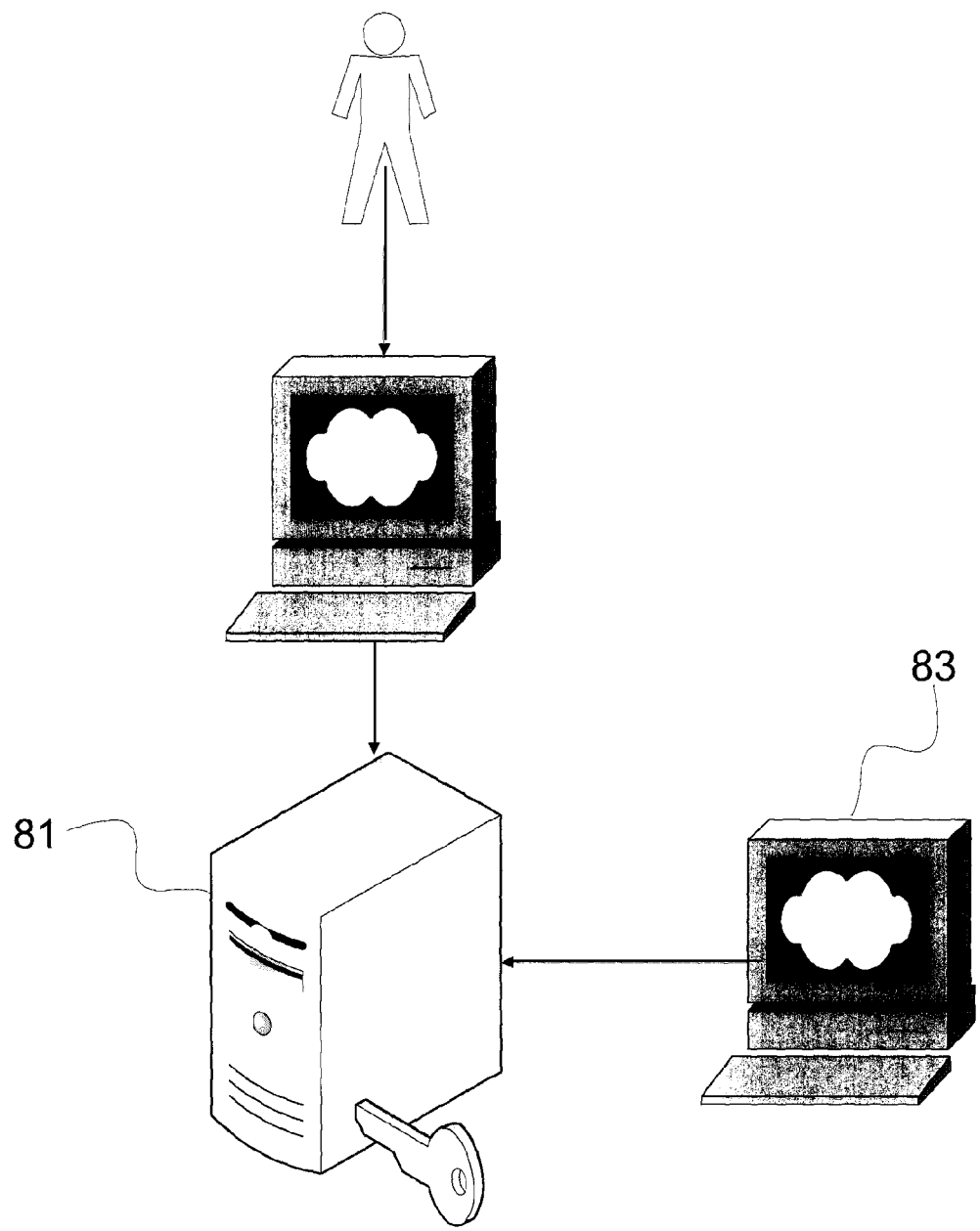
FIG. 21 illustrates one aspect of the present invention wherein a remote web browser or mobile device is enabled to access a proxy server, providing a connection to the functions of the present invention.

The GUI, the processing engine, and the database may be provided on one or more devices. FIG. 21 illustrates one aspect of the present invention wherein a remote web browser or mobile device (83) is enabled to access a proxy server (81), providing a connection to the functions of the present invention. The GUI may be provided on a mobile device (83) such as a PDA or cell phone and transmit information back and forth to a remote engine running on a website, server, or a user's desktop or laptop computer. In such an implementation, the PDA or cell phone may be provided with a facility for browsing of images and a facility for uploading images that are captured using a camera incorporated on the device. Uploading may be performed in accordance with the general uploading processes described more fully below.

The steps performed by the user using the computer program may include:

Specifying the folder(s) to monitor for new digital photos.

Training the application by identifying the names and metadata associated with faces found in the digital photos.

Correcting the errors made by the application; both false positives and false negatives.

Creating albums (collections of photos) by specifying search criteria including date ranges, Boolean combinations of known persons (via face selection), EXIF tags, and general tags. Optionally, the user may drag and drop individual photos or groups of photos to the album.

Once an album is created the user may then specify various output options including:

Third party websites such as Flickr™ and Facebook™.

Slideshow formats such as Microsoft Powerpoint™ files.

Document formats such as Adobe™ PDF™ files.

Inviting other application users to join in a peer group, specifying the options related to those relationships in the peer group, and accepting invitations to join a peer group for another user.

The networked computer architecture may also include one or more servers to enable techniques described herein. For example, the advertising method provided herein may be enabled by the servers. The servers, which may be provided on one or more server systems, may include server programs that enable the functions of the servers, including:

A registration server having a database enabling association of a list of email addresses, associated dates, and other administrative data. The registration server may present an interface such as a webpage to the user for collecting the registration data and then writing this data to the database. The user may then be given a means for installing the computer program described above, such as by being provided with an URL for downloading the client software.

An ad matching server may accept encrypted requests containing the demographic information for the user. This server may also accept ads in a plurality of formats (such as .JPG, .GIF, .SWF, etc.) from advertisers. For each ad submitted to the application the target demographic for the ad may also be recorded. The ad requests may be matched with the inventory of ads based on the target demographic data. Pointers (unique ID #'s) may be returned for matching ads to the requesting client software.

An ad delivery server may accept encrypted requests containing pointers to ads. The application may find the ad referenced by the pointer and return that ad to the requesting client software.

Peer Groups

Referring again to FIG. 1, a first user (13) of the invention may download the computer program from a website or be provided with any other installation means for the installing the computer program. The first user (13) may install the computer program, which may enable the system of the present invention on their laptop or desktop computer system (15) running an operating system (such as the MICROSOF™ WINDOWS™, APPLE™, or LINUX™ operating system).

The first user (13) may define friends (17) in a peer group by specifying their email address to the invention. The computer program may subsequently send an email invitation requesting that a friend (17) also download or otherwise enable the installation of the computer program. After installation, a corresponding computer program for the friend (17) may present to the friend (17) a pending request to join the peer group started by the first user (13). The friend (17), who may now be a second user (17), may be required to approve the connection to the peer group. Once approved, the computer program run by the first user (13) and the second user (17) can now exchange photos as well as metadata about those photos and about known persons, in accordance with the image sharing methods herein described.

The peer group may be expanded by the first user (13) or the second user (17) by inviting more people (19, 21) to join the peer group. The second user (17) may also create a new peer group that the first user (13) is not part of, and expand that peer group separately. There may be a "many to many" relationship between people and peer groups. Thus the first user (13) can be a member of multiple peer groups and the second user (17) can be a member of multiple peer groups. This enables the easy sharing of photos with other users based on peer group membership.

As described more fully below, the present invention, in one aspect thereof, enables a known person list. Known persons may optionally be added to one or more peer groups, as described above.

Peer groups may enable sharing of photos, metadata about photos, and known persons. The GUI may enable creation, modification and deletion of peer groups by a user. The GUI may also enable association of a face image or thumbnail of a known person into an existing peer group, for example by enabling a user to drag the face image or thumbnail over an area of the interface, such as a field or icon, representing the peer group.

The computer program may generate an invitation each time a friend is added to a peer group. Alternatively, the user may manually add an invitee's metadata to the peer group if the invitee is not part of the known person list. The invitation to an individual may be sent to the invitee via email. For individuals that have installed the computer program of the present invention on their computer system, the email, once received, may prompt the invitee to accept the invitation. Optionally, the individual will be required to enter a code in the computer program to accept the invitation.

If the friend has not yet installed the computer program of the present invention on their computer system, the email, once received, may include a link to download or otherwise enable installation of the computer program and may provide directions for installing it on a computer system. Following successful installation of the computer program the new user may be presented with the invitation, and may accept the invitation to join the peer group in accordance with the steps described above.

Once the invitation is accepted by the invitee, the invitee may be added to the peer group. The update may be disseminated over the networked computer architecture to enable the corresponding peer group information to be updated in the computer program of each person associated with the peer group.

In accordance with the face detection technique described below, the peer group may enable automatic selective dissemination of information across the networked computer architecture. The dissemination technique is also more fully described below.

Face Detection

Figure 3:
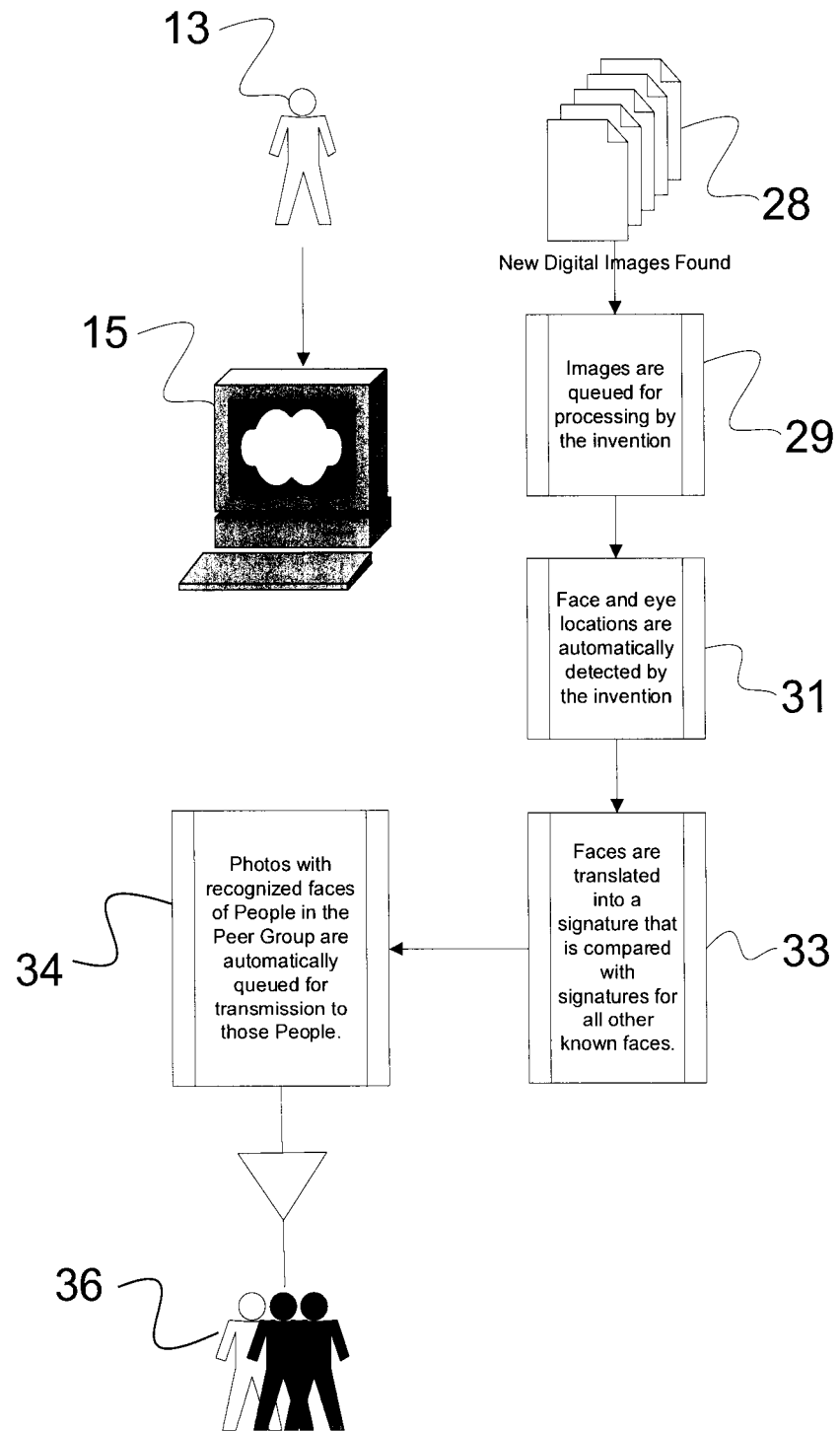
FIG. 3 illustrates the face recognition method of the present invention, in one aspect thereof, for generating face "signatures" that are compared with signatures of known persons.

The present invention, in one aspect thereof, provides a novel method for generating face signatures based on faces depicted in images. FIG. 3 illustrates a face recognition method in accordance with the present invention, in one aspect thereof. A user (13) may provide images to a computer system (15) operable to enable the execution of a computer program. The computer program may monitor file folders associated with the computer system (15) via operating system notifications that may be generated when new files are added or existing files are modified. When new images are found (28) they may be queued (29) for processing.

Faces in the photos may be located (31) by using any one of multiple techniques that may include: generating face coordinates, which may define a bounding box around the face; determining eye coordinates based on the face coordinates; and creating face signatures (33) for the face based on the face and eye coordinates and by using a face signature technique. The face signature technique may be Principal Component Analysis (PCA), which is known to those skilled in the art. The face signatures may be compares to known face signatures (34) and the photos may be automatically and selectively disseminated to other users (36). Further details of these aspects of the invention are provided below.

Figure 4:
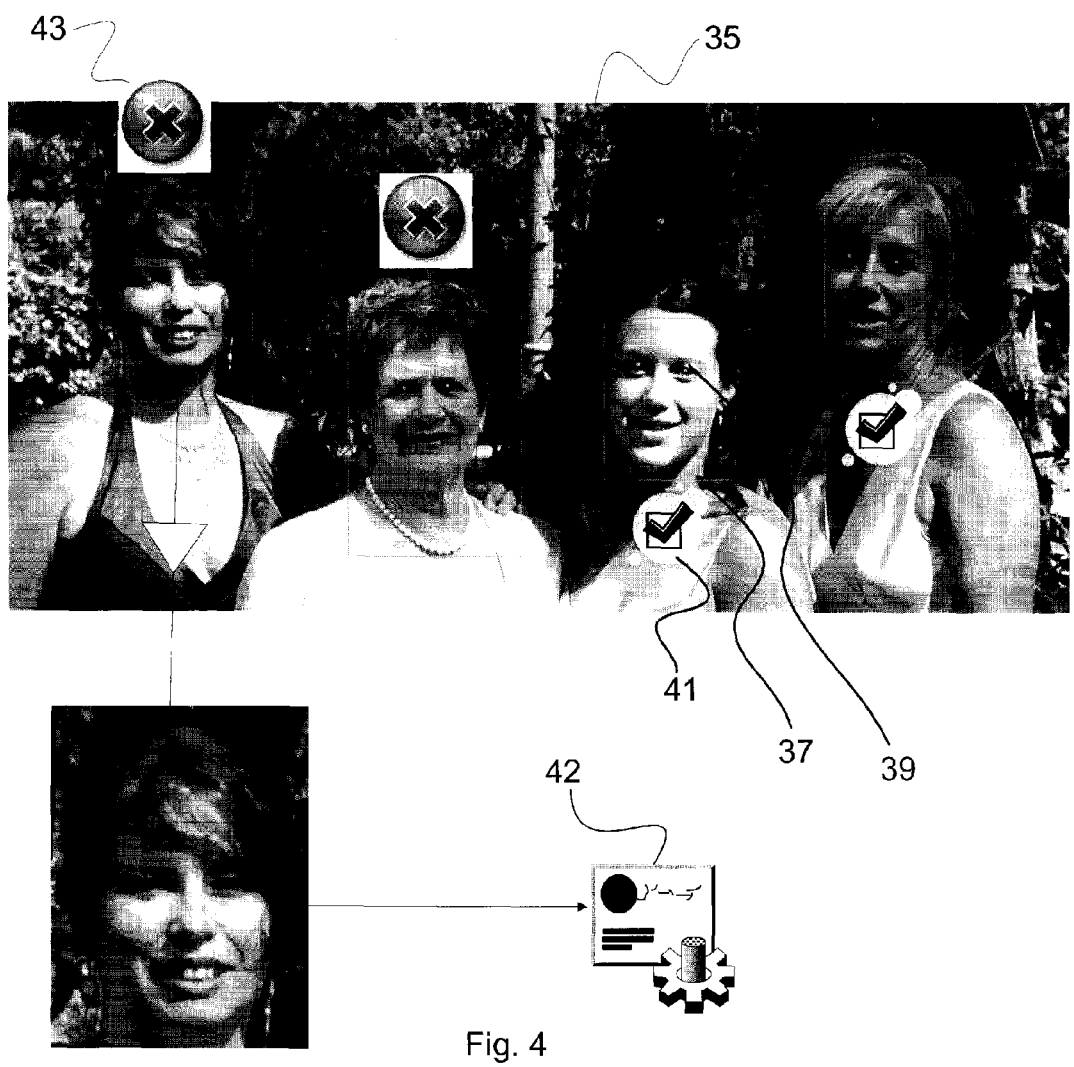
FIG. 4 illustrates linking the results of a face detection, eye detection and face recognition technique in a face database on the storage device of the local computer system.

FIG. 4 illustrates linking the results of a face detection, eye detection and face recognition technique in a face database on the storage device of the local computer system. The results may be the coordinates of the associated object. In the case of face detection, the coordinates may define the outline of the face (37) with top left, top right, bottom left and bottom right pixel locations on the original photo. In the case of eye detection, the coordinates may represent the pupil location (35) of the left and right eyes. In the case of face recognition, the result may be a face signature (42).

The graphical user interface (GUI) for the invention may display the face (37) and eye (39) locations on each image (35). As described more fully below, the present invention, in one aspect thereof, provides a list of known persons. If the face signature (42) corresponding to a detected face is associated with a person listed in the known persons list, the GUI may indicate such an association to the user using a graphic notation on or around the image. Otherwise, the GUI may indicate that there is no such association to the user using another graphical notation on or around the image. In the example depicted by FIG. 4, the known faces may be identified with check marks (41) and the unknown faces with the symbol "X" (43).

Initially all faces may be unknown to the system until the user "trains" the invention to recognize faces. The training method may involve the user. The user, via the GUI of the invention, may use the mouse or other input device to identify the face as belonging to a specific person, by clicking anywhere on the visual bounding box surrounding the face and dragging the face over top of the person's name (or an icon representing the person). Alternatively, the user may drag the icon representing that person over top of the target face. In yet another alternative, the user may click anywhere on the visual bounding box and select a function for identifying a previously unknown face, which may enable the user to enter data related to that person such as name, email address and other details, which may collectively be referred to as metadata corresponding to the person. This training step may be performed once for each known person. The signature that was created for the face may then enable comparison of all the unknown face signatures in the face database with the person identified. Both the method for comparison and the method of face detection, eye detection, and face recognition are described more fully below.

The present invention, in a further aspect thereof, facilitates an optimal training stage by ordering the unknown faces such that the user can identify groups of detected faces that are most likely associated with a single individual. For example, an algorithm could be used to cluster similar faces together based on face signatures. The similarity may be based on certain aspects of their face signatures even when the faces are not already associated with an individual in the face database. Thus a user can identify a cluster of faces as belonging to a particular known person and thereby optimally carry out the training method described above.

Association of Faces with Known Persons

Figure 16:
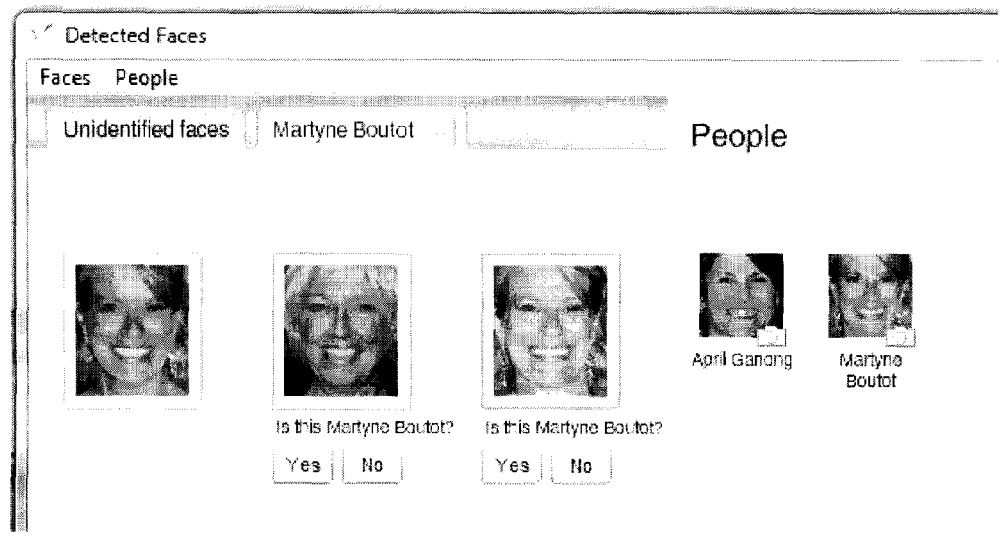
FIG. 16 illustrates an interface for enabling a user to confirm the identity of a face appearing in an image.

FIG. 16 illustrates an interface for enabling a user to confirm the identity of a face appearing in an image. A face signature in an image may be within a similarity threshold to a face signature associated with a known person. In this case, an association may be made between the detected face and the known person. One method of comparing face signatures is described more fully below.

If there is an association between the face and a known person, a further association may be created in the database between the face signature and the known person. Every previously identified face for every known person may be compared with each new face processed by the system. When viewing the faces related to a specific known person, any suspected matches generated by the invention may be displayed and the user may be asked to confirm that the matches are correct.

Over time, as the number of identified faces increases, the overall accuracy of matching new faces with the correct person may increase since there will typically be many different views of a person with each new face. In accordance with the method of comparing face signatures provided herein, the number of false positives therefore typically decreases over time.

Figure 5:
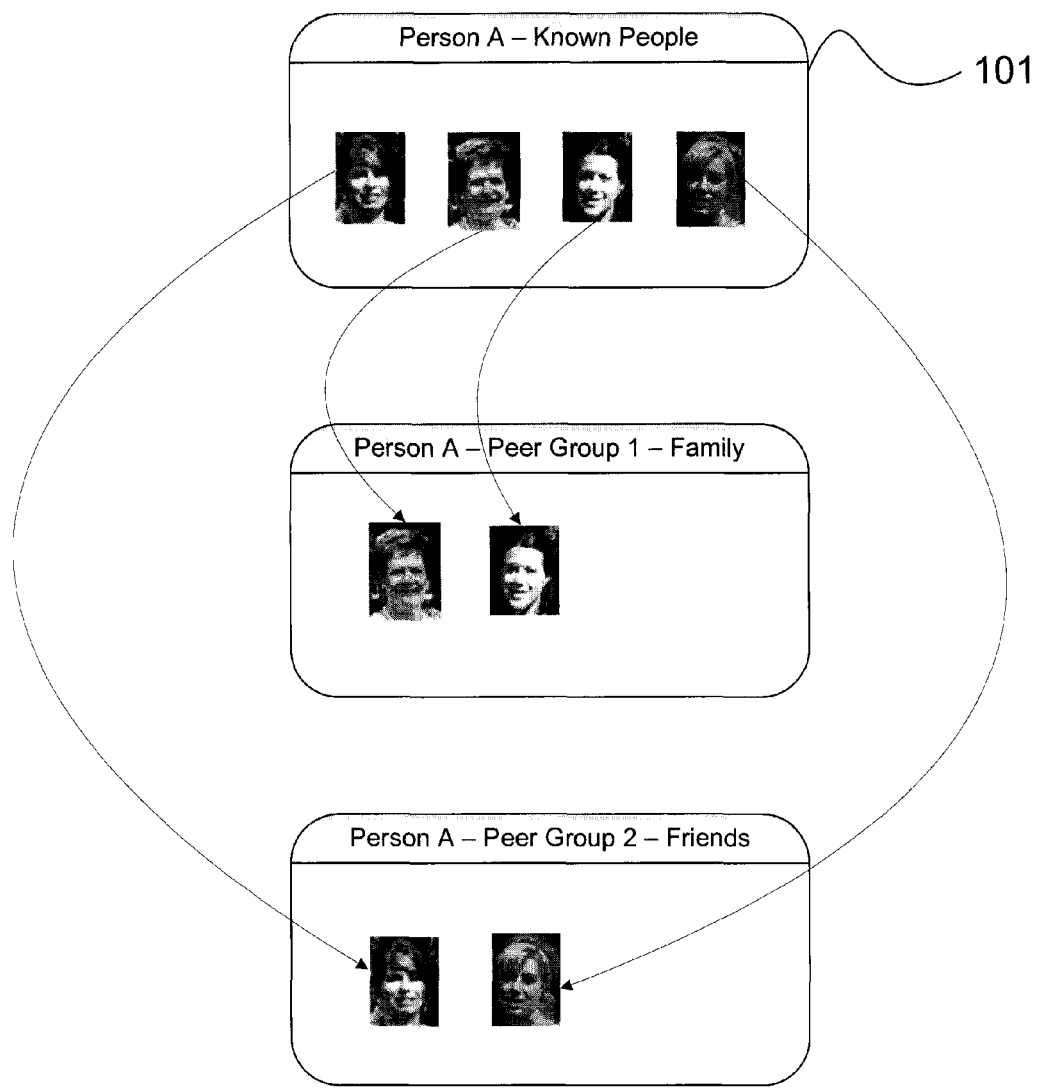
FIG. 5 illustrates how peer groups can grow and evolve over time as the list of known persons grows.

FIG. 5 illustrates how peer groups can grow and evolve over time as the list of known persons grows. The list of known persons (101) grows as the user works with the invention, because the user may continue to associate unknown faces with known persons.

Dissemination

Figure 2:
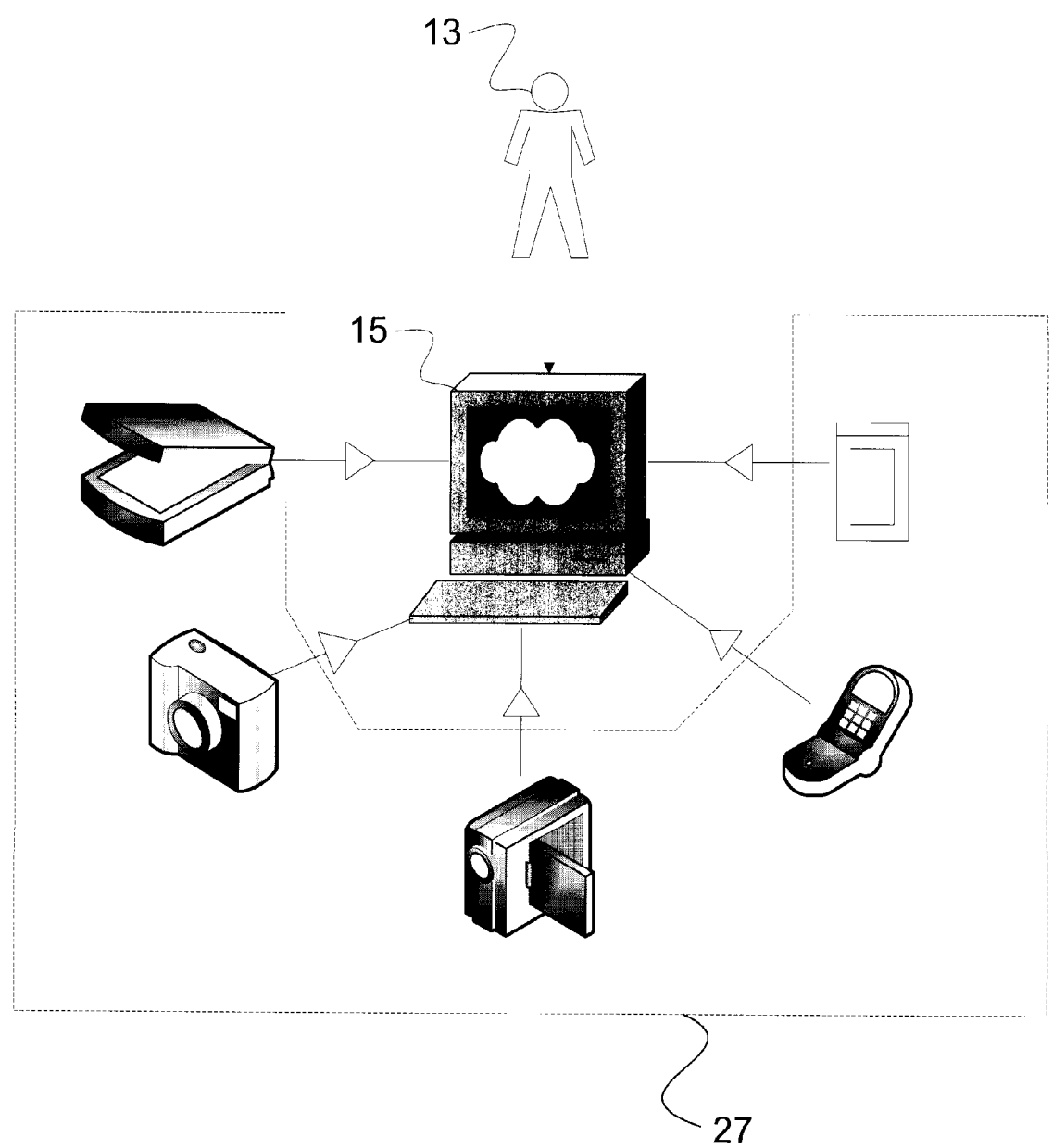
FIG. 2 further illustrates the system illustrated in FIG. 1, wherein users add new digital images from various devices over time.

The present invention, in another aspect thereof, provides a computer program operable to enable each of the individuals to interface with the networked computer architecture herein provided for sharing images. FIG. 2 further illustrates the system of the present invention. A user (13) may capture digital images and periodically copy them from one or more image device storage systems (27) to a computer system (15). The user (13) may configure the computer program to monitor specific file folders on the computer system (15) for new images, by inputting the names of the file folders to the computer program using a GUI as described above.

In accordance with the novel method for face recognition provided by the present invention, the present invention, in one aspect thereof, enables the automatic selective dissemination among a peer group to users whose faces are depicted in images. This is more fully described below.

Detection Optimizations

Figure 6:
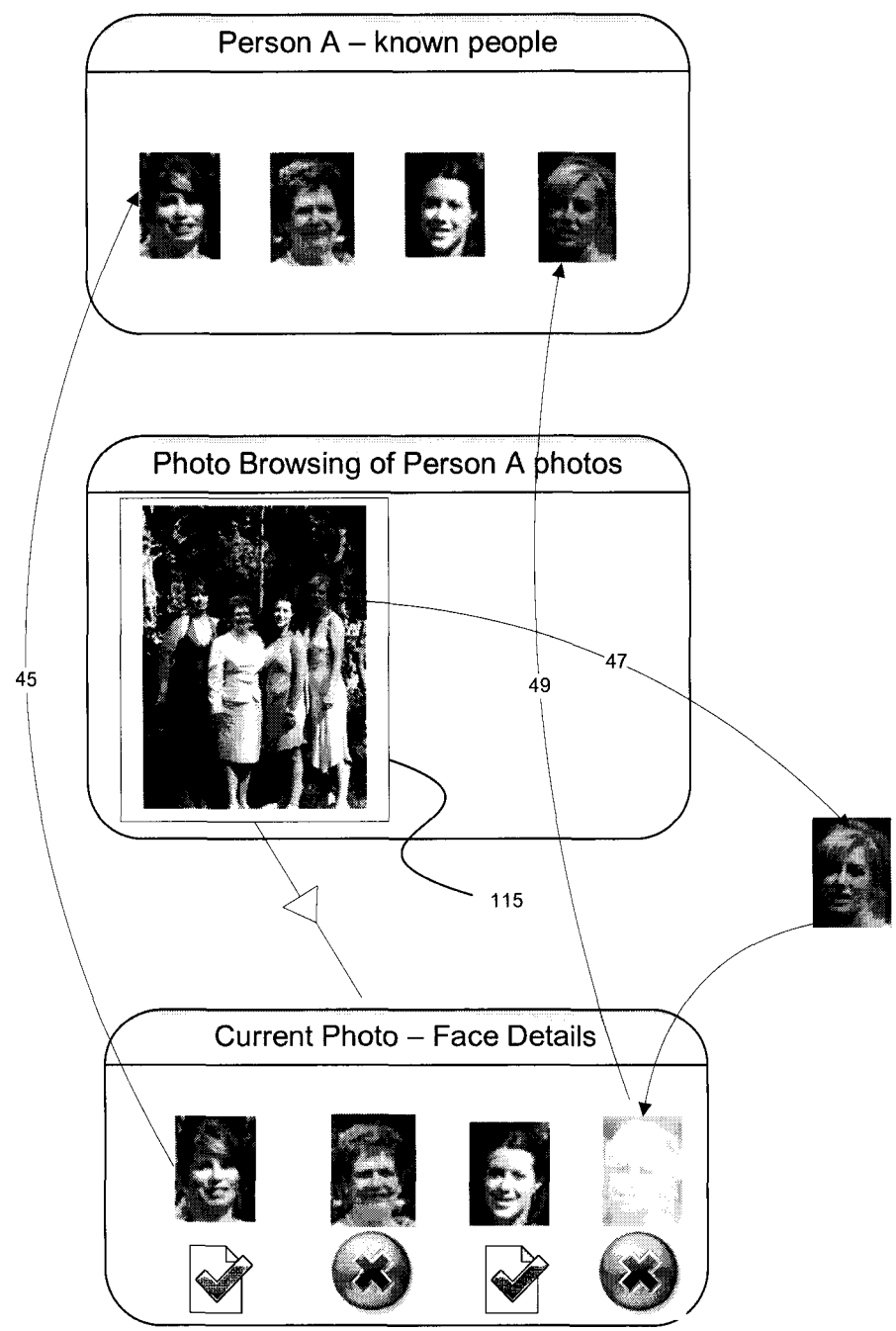
FIG. 6 illustrates potential methods of correcting errors that may result from the automatic face detection, eye detection, and face recognition steps.

The present invention, in one aspect thereof, provides a novel technique for optimizing face detections in accordance with other aspects of the present invention. FIG. 6 illustrates potential methods of correcting errors that may result from the automatic face detection, eye detection, and face recognition steps. The invention uses a novel way of involving the user through the GUI to correct these inevitable errors.

Figure 17:
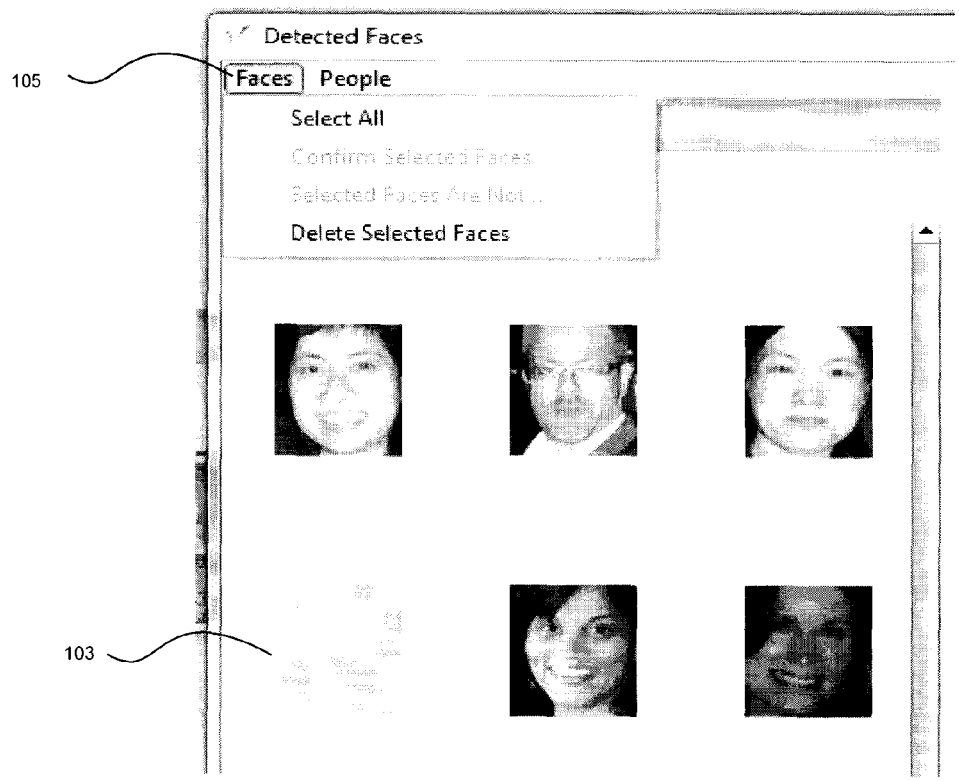
FIG. 17 illustrates a means by which a user may delete false positive face detections in an image.

FIG. 17 illustrates a means by which a user may delete false positive face detections in an image. During the face detection and eye detection phases, there may be false positive errors. These may occur when the face detection technique determines that a face exists even though there is actually no face on the original photo image. To correct these errors the GUI may enable the user to delete false positive errors by moving the face (103) (with the face being identified by a bounding box on the image) over a deletion area (which may be represented by a wastebasket or other representative icon) using a mouse or other input device, by pressing a keyboard's delete key while the face is highlighted, or by selecting a menu option (105) corresponding to deletion of the face.

Figure 18:
FIG. 18 illustrates a means by which a user may reposition detected eye coordinates corresponding to a face in an image for the purpose of increasing accuracy of the detection algorithm.

FIG. 18 illustrates a means by which a user may reposition detected eye coordinates corresponding to a face in an image for the purpose of increasing accuracy of the detection algorithm. During the face detection and eye detection phases, there may be errors in eye location coordinates (107). The method of the present invention may determine the eye pupil location and display the eye coordinates (107) visually on the image, but the generated coordinates may not be perfect because they may be an approximation in some cases (for example, a face with sunglasses). The GUI may allow the user to manually reposition the eye coordinates (107), for example by moving the icons (109) representing the eye location with a mouse or other input device. In this way, the accuracy and performance of the invention can be increased as the eye coordinates (107) are typically used to generate a face signature for the face. A change in the eye coordinates (107) may therefore generate a change in the face signature that may significantly affect associating signatures with other with known faces.

Figure 22:
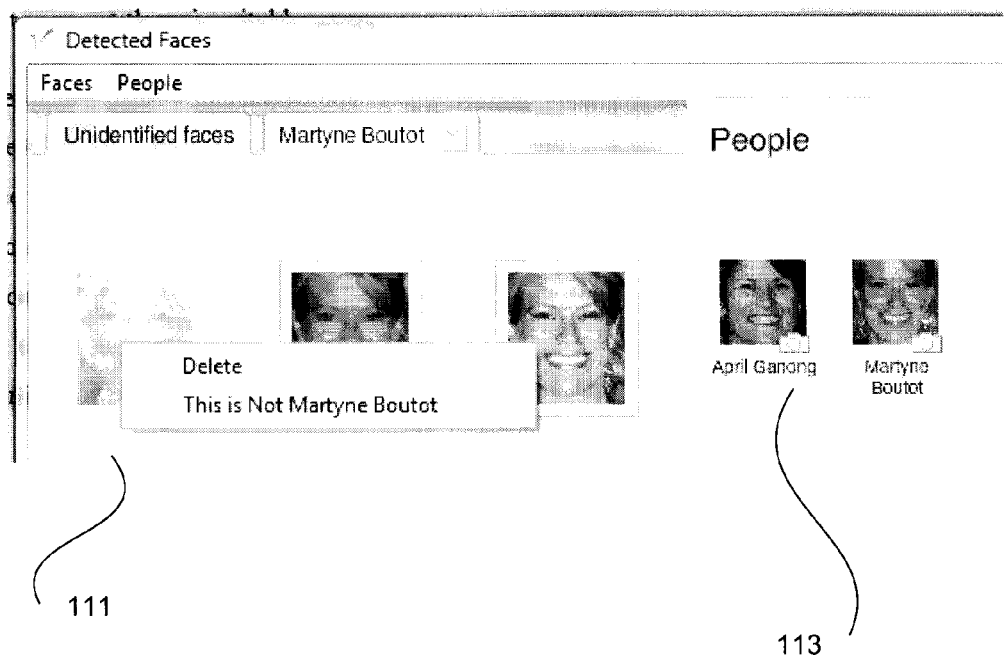
FIG. 22 illustrates deletion of a false positive face detection error.

FIG. 22 illustrates deletion of a false positive face detection error. During the face recognition phase, there may be false positive errors related to incorrect association of a face with a known person. A false positive error may result if the invention matches a face signature to a known person and it is not a correct relationship. The GUI may allow the user to drag the face image (111) (thumbnail) over the face image (thumbnail) of the correct known person (113). The invention may then modify the link in the database to show the new relationship between the face and the known person. The old relationship may also be deleted.

Figure 19:
FIG. 19 illustrates the process of manually tagging a face in an image.

Another category of errors is false negatives. There may be two situations categorized as false negative errors, which are illustrated in FIG. 6:

1) Where the system does not detect a face in an image when there actually is a face (47), the GUI may allow the user to draw a bounding box around the face using a mouse, or other input means, and then place both eye locations by using icons representing the eye location. The system may then use the manually entered information to generate a face signature and perform the face recognition method provided herein. Alternatively, the system may enable the user to manually associate a tag with the face without involving the face detection or recognition process.
2) There may also be a false negative error where the system detects a face but the face signature is not matched with any known face signatures even though it is a face of a known person. This may occur if the difference between the signature for the face and any other face signatures for that particular person are too dissimilar. In this case, the system may not automatically detect the relationship and the face may remain unknown. In this circumstance, the GUI may allow the user to drag (49) the face image over the face image of the known person. By doing this the system may link the face image to the known person in the database. With this assistance from the user, the system now has another face signature that will be used for future comparisons with new and unknown face signatures. This may improve the accuracy of the present invention. FIG. 19 further illustrates the process of manually tagging a face in an image.

Automatic Selective Dissemination of Images

Figure 7:
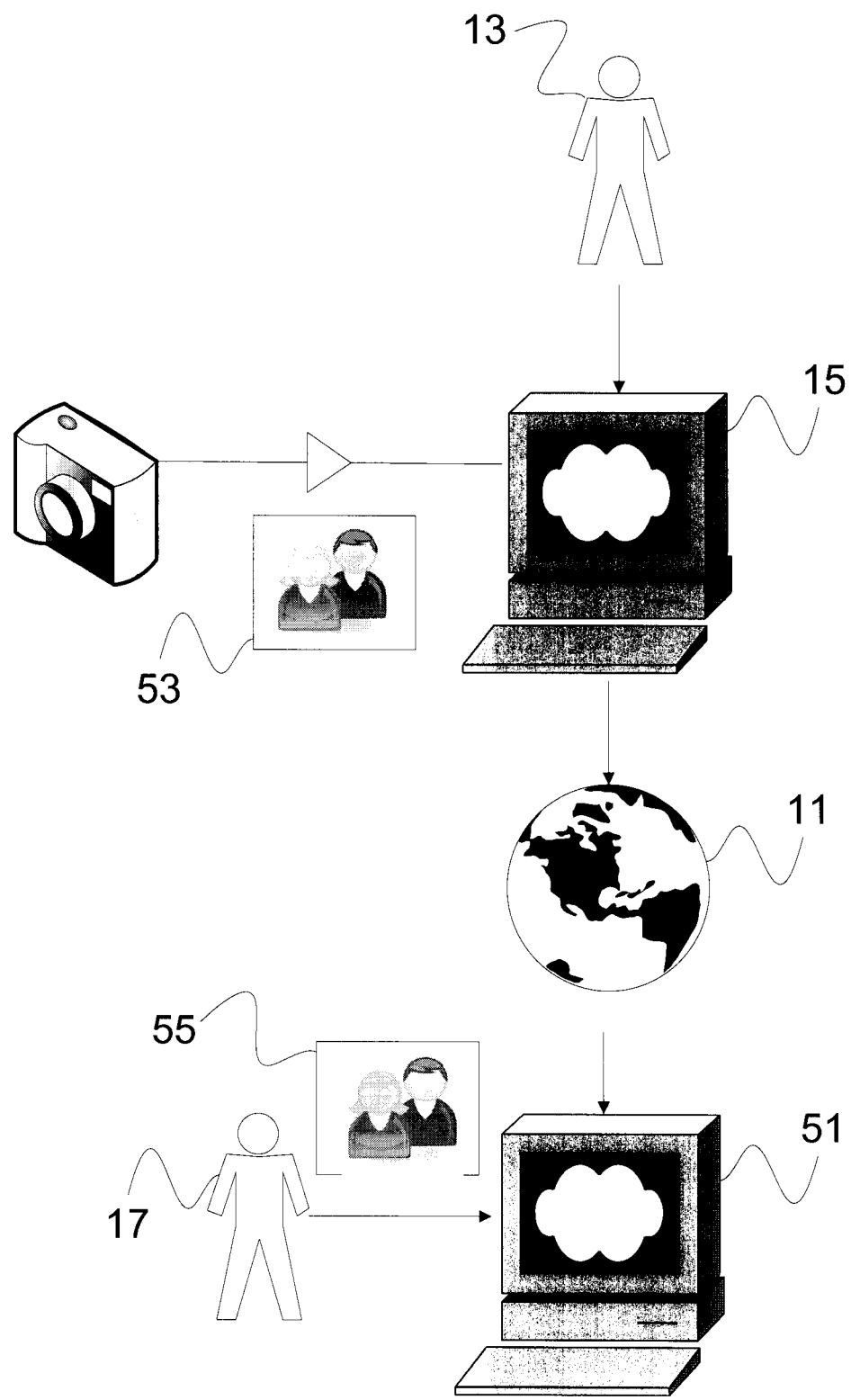
FIG. 7 illustrates a system and method for providing the automatic selective dissemination of photos between users of the invention in the same peer group.

FIG. 7 illustrates a system and method for providing the automatic selective dissemination of photos between users of the invention. When the face of a known person that is a member of a peer group is recognized within a photo (53), the photo (53) may be queued to be transmitted across the Internet (11) in a secure fashion to the peer group member. For example, a first user (13) may upload to their computer system (15) a photo containing the face of a known person that is a second user (17), who is also a peer group member. In this case, when the system determines a face match, the photo (53) may be queued for transmission. Prior to transmission the photo (53) may be reduced to a smaller version and metadata may be included in the digital photo file. The corresponding reduction in size may optimize the use of bandwidth.

The next time the second user (17) accesses the computer program on their computer system (51) it may receive a confirmation request showing a reduced image of the original photo and the associated metadata. The second user (17) may be prompted whether they would like a copy of the photo (55) on its computer system (51). If the second user (17) responds affirmatively then the system may copy the full image across the Internet from the first user's computer system (15) to the second user's computer system (55) along with the metadata for the photo (55) and the known faces and signatures from the photo.

Another novel aspect of the present invention uses existing social network service and web-based photo storage sites to share photos with peer group members. The invention may transmit a single photo or group of photos to a target web-based service. The transmitted photos may already contain metadata from the invention about the people that are in the photos. For example, the social networking site FACEBOOK™ offers the facility to upload photos, share photos, and to manually tag photos to denote which friends are in the photos. The tagging process is manual and time consuming. The present invention may automate such an upload process and eliminate the need to manually tag the photos thereby offering a significant benefit to the social networking user. The present invention may be equally adaptable to other social network service and web-based photo storage sites. As described above, a user may also upload photos directly from a mobile device that incorporates a camera across the Internet.

Yet another novel aspect of the present invention is that the initial list of known persons can be loaded from the user's social networking account to save further time in configuring the system provided by the present invention.

Figure 8:
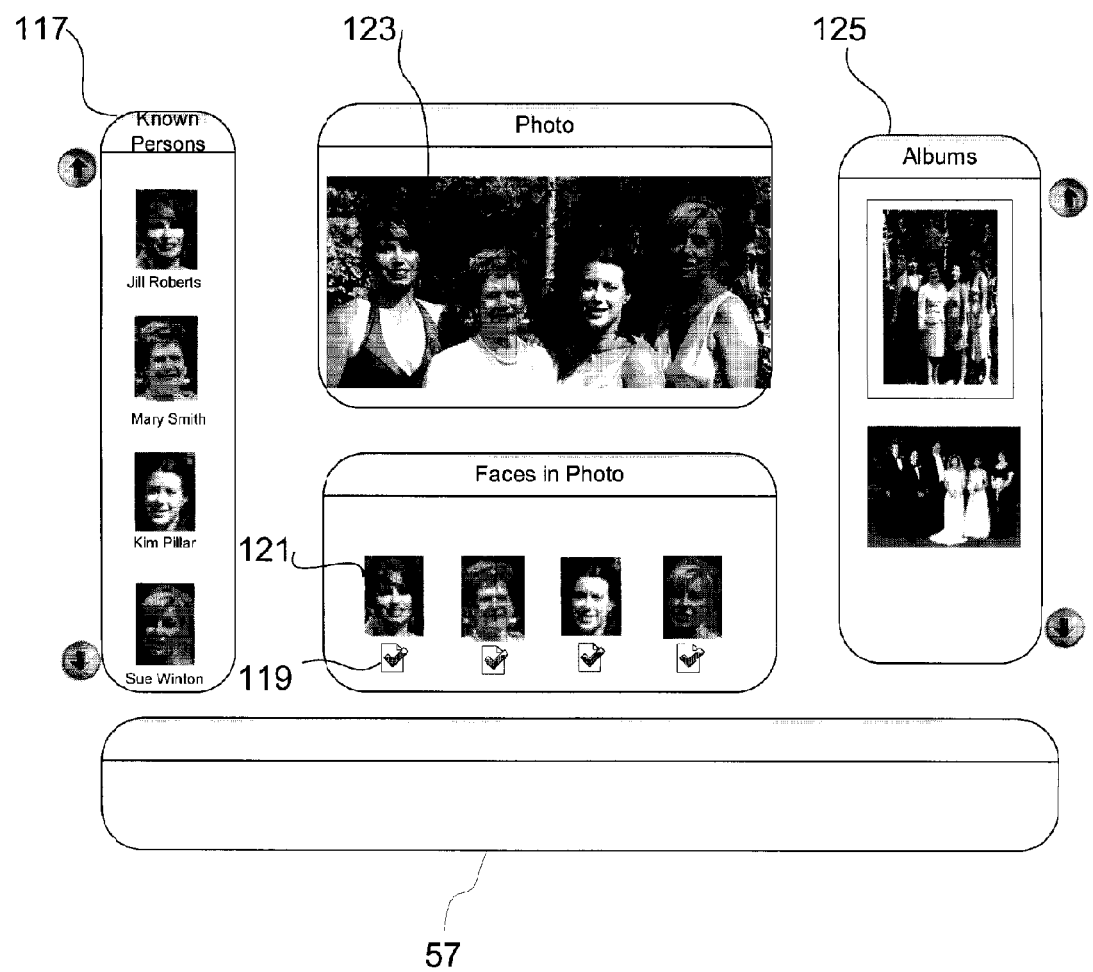
FIG. 8 illustrates an example embodiment of the graphical user interface that may enable browsing of photos and the face database managed by the computer program.

FIG. 8 illustrates an example embodiment of the GUI that may enable browsing of photos and the face database managed by the computer program. In this example a user interface is shown with optional banner advertising (57) that could be sold to advertisers. A user may select a photo (123) from an album (125), and the GUI may display thumbnails (121) corresponding to known persons (117) found in the photo (123). Checkboxes (119) may also be used to indicate the presence of the known persons (117) in the photo (123).

Figure 9:
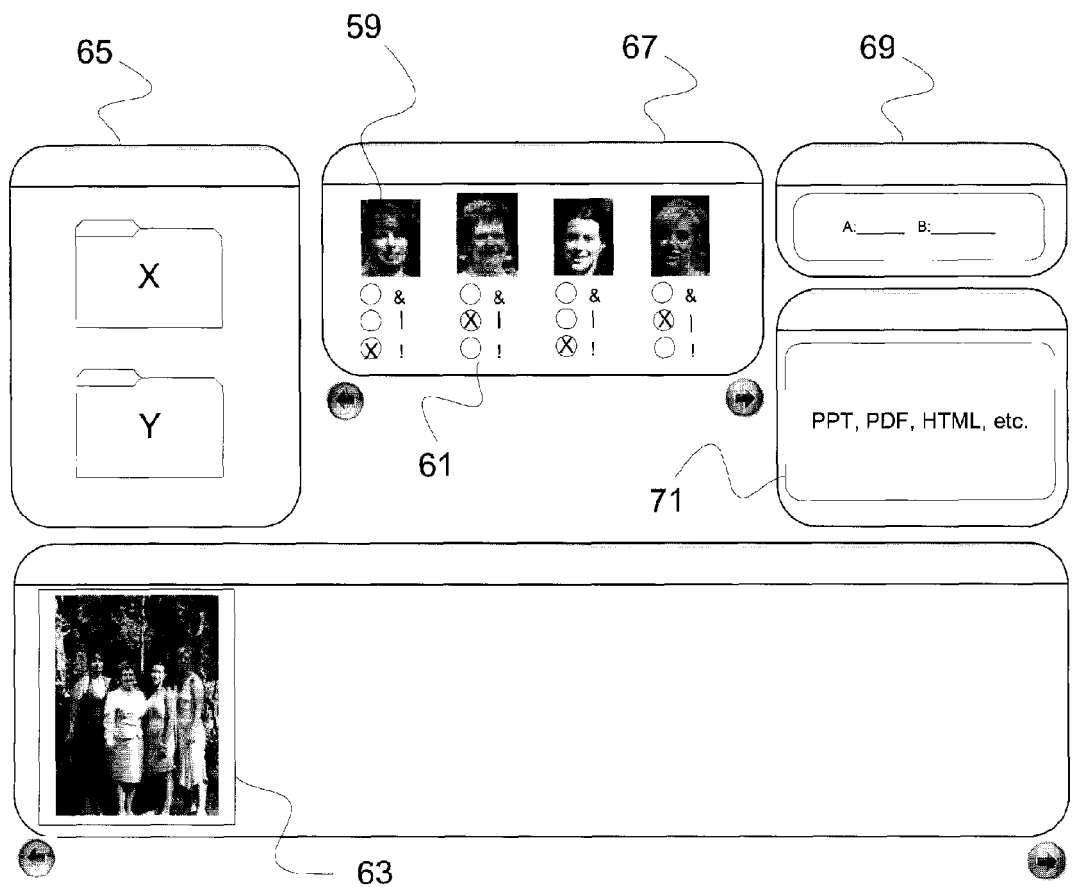
FIG. 9 shows face images for known persons plus Boolean operators to narrow the field of photos.

The example depicted in FIG. 9 shows face images for known persons plus the checkboxes for applying Boolean searching such as AND, OR, and NOT selections associated with names of known persons or metadata related to images. A novel feature of the invention is the ability to select photos in a visual manner by allowing the user to click on a thumbnail view of the faces of known persons (59), and applying Boolean operations (61) for each face enabled by checkboxes. This aspect of the GUI enables the creation of an album by combining various search criteria and filters that are applied against the total photo and face database.

Search criteria provided by the computer program may include:

- Folder selection (65), indicating the folder location or file name of photo images on the computer storage device;
- Known persons (67), providing the selection of Boolean operations (AND, OR, or NOT) associated with the faces of the known persons;
- Date range (69), providing the selection of a range of dates corresponding to the photo images to be included in the specific album;
- EXIF data, providing a selection means based on standard photo related information usually appended to the photo by the camera during the photo taking process.

An alternative method of selecting photos for an album may provide the user the ability to drag and drop individual photos or groups of photos over top of the name of the album (63), or to otherwise associate the photos with the album (63), using the GUI.

An album (63) may be a group of photos that are saved as a logical entity under the name of the album. The user may specify via the GUI that it wants to send the album to various target file types or locations (71), including a slide show, MICROSOF™ POWERPOINT™ or other presentation computer programs, ADOBE™ PDF™ or other document file, a web-based sharing site such as FLICKR™ or FACEBOOK™, or a third party printing service.

Advertising Method

The present invention, in a further still aspect thereof, provides a novel advertising method that is operable with the networked computer architecture herein provided.

Figure 10:
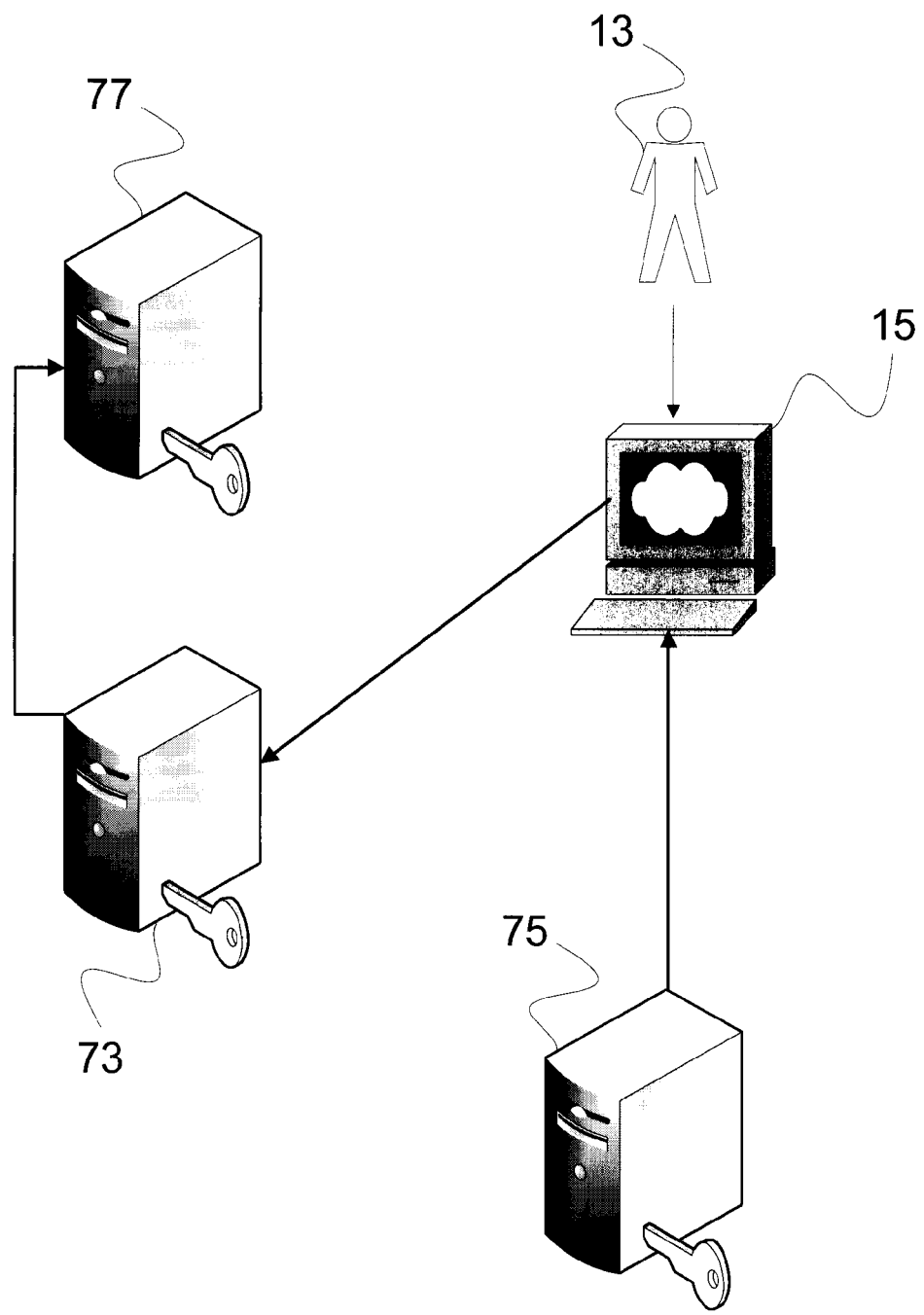
FIG. 10 illustrates an optional advertising display capability provided by the GUI.

FIG. 10 illustrates an optional advertising display capability provided by the GUI. This is a novel feature of the present invention providing a secure method for simultaneously targeting advertising based on user demographics and maintaining user privacy. The GUI may prompt new users (13) for demographic information that may at a minimum include gender, age and location data. This information may be stored locally on the computer system (15) running the computer program. A request may periodically be sent to a web-based server (73) to return a list of ad pointers. The request may contain an encrypted transmission of the demographic data for the user. The request may also be signed using a certificate issued by a registration server (77). This latter step may verify the authenticity of the request. The web-based server (73) may conduct a process of matching ads, which are associated with target demographic information, to the requesting user (13) based on their specific demographic information. A list of pointers (i.e. references to ads that exist on different ad servers) may be returned to the requesting user's computer system (15) and passed to the computer program. The computer program may then issue another request to a different web-based server (75) to download the ads referenced by the pointers. The web-based server (73) may then discard the demographic data to protect the privacy of the individual user.

By separating the web-based servers (73, 77) that perform the ad matching process from the servers (75) that actually deliver the ads, and by not storing the personal demographic data of the user on either of the web-based servers (73, 77), the personal information about the user is significantly more secure than it otherwise would be. The ad delivery servers (75) may store information about ads served for billing purposes but there may be no personal information included in that data. This is a novel implementation for serving ads to any web browser or software program in a secure fashion using demographic data.

Further Implementations

Another capability of the present invention may enable a computer program to receive digital face images or signatures from the central registration server. For example, an organization seeking to find an individual (such as a missing child or a wanted criminal) may post the individual's face data. Those users that have opted to share their face database may download the data enabling an automatic comparison of the face data with their face database. The organization may be alerted if a match is found between the target individual and a known person for a specific user. This could enable the organization to determine a recent or current location of the individual. It could also enable the organization to determine the name of an individual, since the individual's name may be listed in one or more of the user's known persons list.

Yet a further embodiment provided by the present invention enables an individual to find other persons with similar facial features as themselves. Such an application may be useful for a person to find their twin, for example. In this embodiment, a user may submit a photo including an image of their face, from which the present invention may generate a face signature. The face signature may then be compared to other individuals' face signatures that have been previously uploaded. Based on a predetermined similarity threshold, one or more similar faces may be reported to one or all of the individuals whose faces match. A system in accordance with this embodiment may provide a means for a user to approve contact with others. Matched individuals could choose to send a message to one another if they have specified their approval for such contact. A similar embodiment could be deployed as part of a dating service to match people based on looks.

Face Detection, Eye Detection and Face Recognition

The present invention, in yet another aspect thereof, provides a novel method for generating face signatures based on faces depicted in images. The face signatures may be generated by using a technique that includes the steps of face detection, eye detection, and face recognition.

Face Detection

The present invention, in one aspect thereof, provides a method for utilizing a texture-based face detection algorithm as a base method for face detection. One example of a texture-based face detection algorithm is the open source library of routines known as OPENCV™.

The texture-based face detection algorithm may have a low true-positive rate for specific facial poses, for example rolled frontal faces. This may be due to the texture pattern being trained on frontal face images which differ from the varied facial poses found in normal digital photos. In reality, having a mismatch between the texture pattern used to train the face detection algorithm and the type of poses in the target photos on which the algorithm is applied would result in a higher percentage of errors. Two well known challenges presently faced in face detection include decreasing false-negative errors in the case of rolled frontal faces and reducing false-positive errors while not increasing false negative errors.

The present invention enhances the texture-based face detection by applying novel techniques involving three steps to improve the accuracy of the face detection process. In the first step a novel application of the known skin color ratio test on a texture-based face detector is provided to improve the accuracy of the detector. In the second step, a novel method for reducing false-positive face objects is provided by reducing the size of detected face object regions to a predefined size. In the third step, a novel face orientation compensation method is provided.

Figure 11:
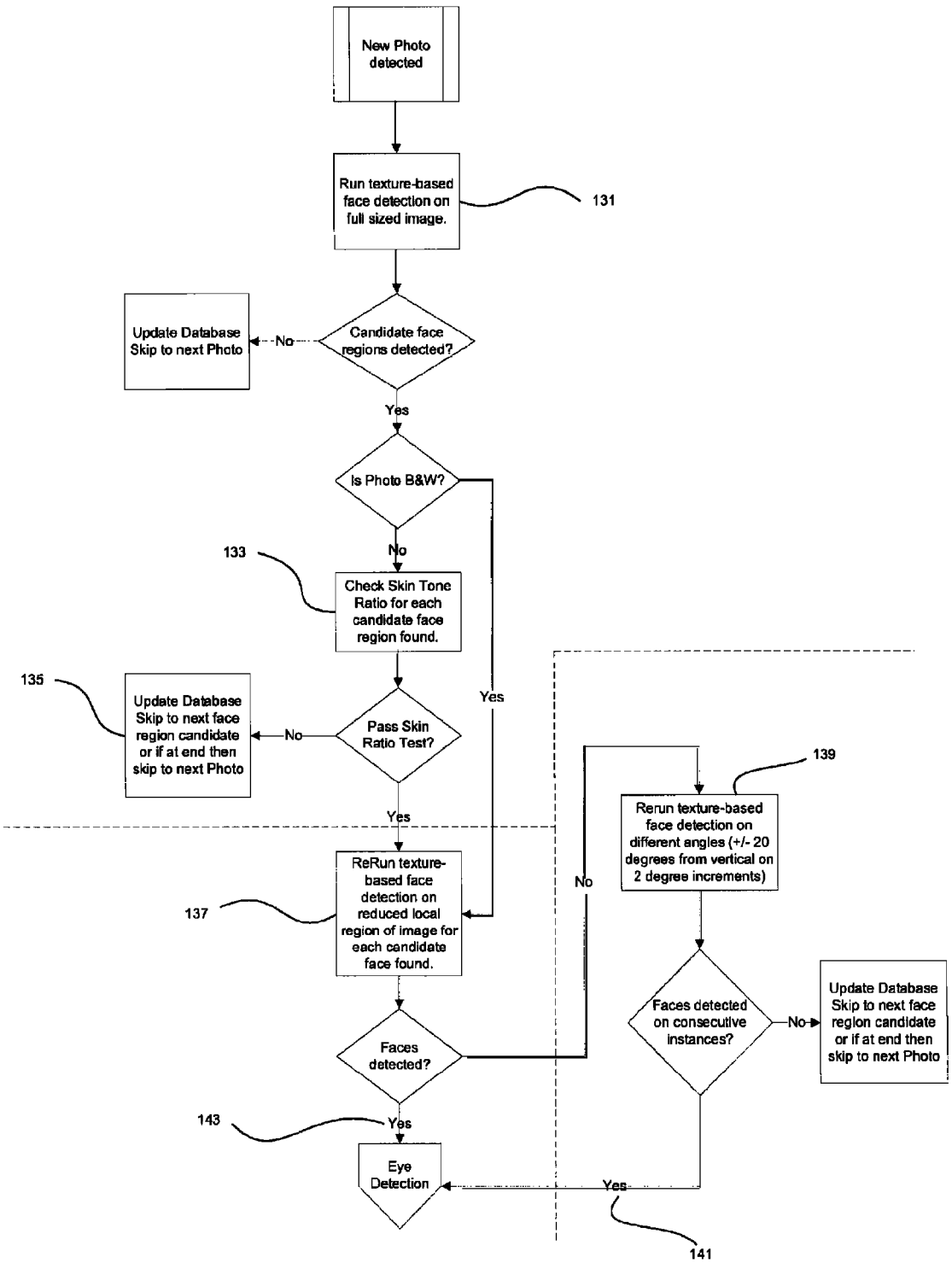
FIG. 11 illustrates the texture-based face detection method of the present invention, in one aspect thereof.

FIG. 11 illustrates the texture-based face detection method of the present invention, in one aspect thereof.

In one particular implementation of the texture-based face detection method, in the first step, the texture-based face detector (131) may initially be set for a high target true positive rate which has a corresponding high false positive rate. The texture-based face detector may be run with the entire photo image as input. The results from this run may give a list of potential face objects in the photo. For a color photo, a skin color detection test (133) may be performed on the potential face objects to reduce the false positive rate. This skin color test may compare the ratio of the face object area containing skin color to the total area of the object. If the ratio does not exceed a pre-determined threshold then the potential face object may be skipped (135).

In the second step, detected face object regions that result from the first step may be reduced to a predefined size (such as 44 by 44 pixels). On these reduced regions, the texture-based face detector may be run again (137). The goal of this step is to reduce false-positive face objects. By running on a small size (such as 44 by 44 pixels) input region, false positive errors from incorrect texture patterns from non-faces may be reduced while true positive texture patterns may be preserved. This may result in a reduction in the false positive rate of face detection while preserving the true-positive rate. Face objects that are deemed to be faces in the second step may be accepted (143) as true faces. Those that do not pass this second step may be passed to a third step.

In the third step, a face orientation compensation method is provided. In the second step described above, in which face detection is performed on smaller regions of the image, the true positive rate may be reduced in the case of rolled faces. The texture pattern in rolled faces may be deemed to be a non-face by the face detector due to the size reduction applied in the second step. To preserve the true positive rate in rolled face cases, face orientation compensation (139) may be performed together with face detection. In this method, the local image region is rotated with an incremental angle and each angle instance may be run through the face detector. One example implementation would rotate the image 2 degrees starting at −20 degrees from the vertical axis and repeating the rotation through +20 degrees from the vertical axis. If rotated face regions are recognized and exist in instances with consecutive incremental angles then the local image region may be determined (141) to be a true face.

These modifications to a texture-based face detection algorithm may significantly reduce the false positive error rate.

Eye Detection

Figure 12:
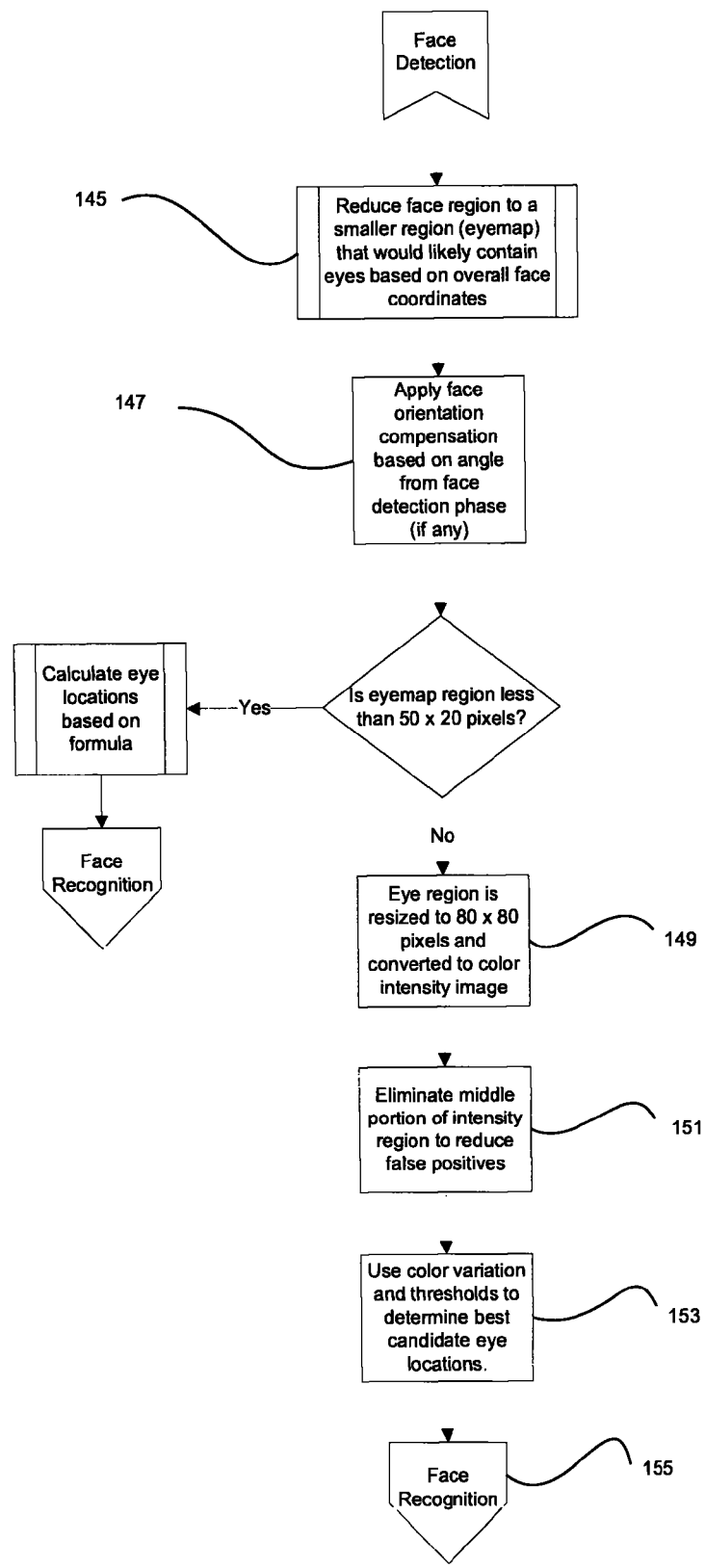
FIG. 12 illustrates a method for eye detection, in one aspect of the present invention.

FIG. 12 illustrates a method for eye detection, in one aspect of the present invention. The eye detection method applies novel techniques to improve the accuracy for detecting the pupil locations in detected face regions. The first step may be to reduce the overall face region to a smaller region (an "eyemap") (145) that would likely contain the actual pupil/eye locations. A formula may be used to crop the eyemap region from the face region. For example, the formula used to crop the eyemap region may be to remove 0.23w on the left, 0.23w on the right, 0.55h on the bottom and 0.30h on the top; where w is the width of the face region and h is the height of the face region. FIG. 14A illustrates a particular embodiment of the method of cropping the eyemap region from the face region.

Furthermore, if the face was detected in the third step of the face detection method on a specific angle instance, then the angle of rotation may be applied (147) to the eyemap region to enable a more accurate selection of the eye locations.

FIG. 14B illustrates that the formula used to crop the eyemap region may be altered to ensure that the eyemap region is large enough to ensure satisfactory pupil detection results.

Once the eyemap region has been cropped, the eyemap region may then be re-sized to a fixed size (such as 80×80 pixels) (149) so that a fixed template color variation method may be applied to determine the candidate eye locations. This method may be based on the darker intensity of the pupil relative to the surrounding area of the eyemap region.

The middle of the color intensity image may be set to zero/black (151) in the intensity map to remove potential pupil candidates that typically result from light reflecting off lenses and the frames of glasses. FIG. 14C illustrates this process.

The color variation image may be obtained from the color intensity image and may then be passed through a threshold filter so that only a small percentage of the eye region is white (for example, a 2% threshold may be applied) (153). Next, a "best fit" method may be applied to choose the eye locations with the highest intensity of color variation (left and right side). The best candidate pupil location coordinates may be passed along (155) to the face recognition method of the present invention.

Face Recognition

Figure 13:
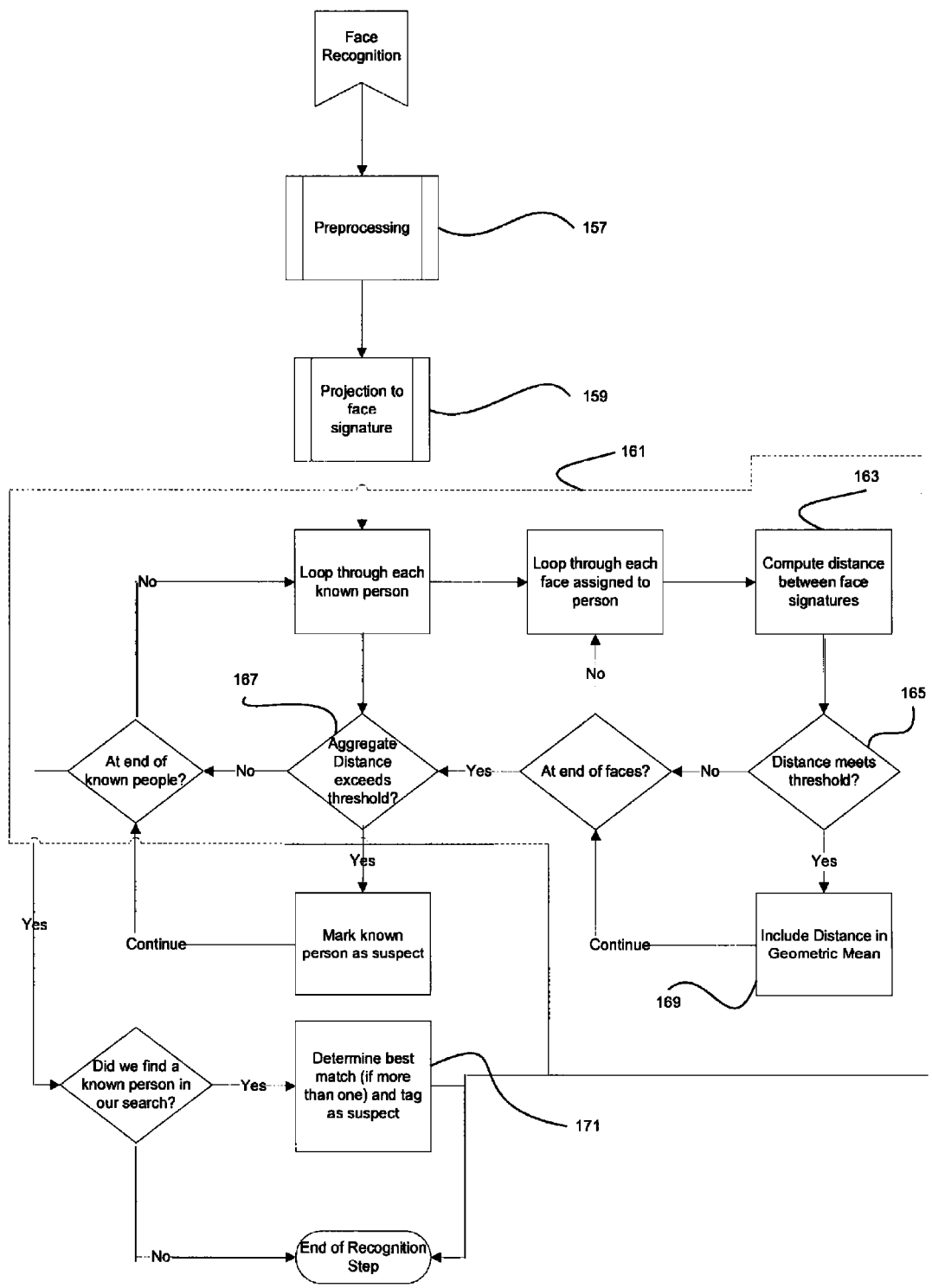
FIG. 13 illustrates the face recognition method, in one aspect of the present invention.

FIG. 13 illustrates the face recognition method, in one aspect of the present invention. Face recognition may generally be performed through pre-processing (157), projection (159), distance calculation (163) and aggregation (167). Principal Component Analysis (PCA) may be employed by the face recognition method. PCA is a known method, used abundantly in all forms of analysis because it is a simple, non-parametric method of extracting relevant information from confusing data sets.

The present invention may employ PCA in a novel way that overcomes its traditional issues with respect to high sensitivity to subject lighting and pose, given that personal photos may have little variation in pose since most subjects may tend to look directly at a camera. The present invention may take advantage of the fact that sets of photos depicting particular persons may be taken over a variety of pose and lighting conditions. The present invention provides a method of aggregating the comparison between the target unknown face and this plurality of faces associated with each known person.

Pre-processing (157) may first be applied to the image. The face region and eye coordinates provided as input to the face recognition phase may be used to normalize the face region. The normalization process may include translating, rotating and scaling the face region to a predetermined template size. The normalization process may use the eye coordinates as reference points such that the face region image is adjusted to place the eye coordinates on specific image pixels. A standard fixed masking process, potentially limiting the face region to the area inside an ellipse, may then be applied to the image to filter out non-face portions. A flattening process, involving running a two dimensional linear regression on the intensity of the pixels in the face region, may be used to ensure pixel intensity is spatially uniform across the image. Finally, a histogram image equalization (an image processing method known to those skilled in the art whereby the contrast of an image is adjusted using the image's histogram) may be performed in the greyscale domain.

Projection (159) may then be applied to the image. The resulting pixels of the normalized face region may be passed through a PCA-based formula to create a PCA vector that is used as the face signature by the invention. The PCA vector may comprise a projection image resulting from principal components extracted from a large set of generic images.

The face signature created from this method may be an array (from the PCA vector) of real numbers of a given dimensionality. Although the exact dimensionality of the vector space may be determined adaptively with its maximum value set to the value capturing, for example, 95% of the input image energy, the default value used may be a dimensionality in the range of 50 to 100.

Finally, looping (161) may be applied to match the unknown face with a known person. Each face signature (represented as an array of numbers) may be mathematically compared to any other face signature using linear or non-linear classification logic to determine a distance value (163). For example, two signatures may be compared by computing a normalized inner product distance.

To compare a face to all of the faces associated with a known person, all of the individual one-to-one comparisons may be made, and then either all of the results may be used in the next step or a set of best matches as determined by comparison to some threshold (165) may be used. The threshold chosen may be chosen such that on average half of the distances obtained when comparing a face to a non-matching person are kept.

Some form of aggregation may be used to combine the set of distance values obtained in the previous step to determine the distance between the face and a known person. This aggregation may be the computation of the geometric mean of the distance values (169). The geometric mean may be an averaging technique similar to an arithmetic mean, but it may be computed by multiplying the N numbers to be averaged and then taking the $N^{th}$ root of the product as the desired average. The closest match between the face and each known person may be found by computing this aggregate distance (167) between the face and each known person in the database and choosing the minimum distance.

Finally, the closest match distance may be compared (171) against a static or dynamically determined threshold to reduce the rate of false positive matches. If a dynamically chosen threshold is used, this threshold may be determined by first assuming the aggregate distance values obtained when comparing a face to a non-matching person having N associated faces are normally distributed (for each possible value of N), and then using the inverse cumulative normal distribution function to compute a threshold which ensures that, on average, a fixed maximum number of or fixed ratio of the unknown faces are falsely matched to a known person. This threshold may vary from person to person as the number of faces, N, associated with each person changes. The advantage of this dynamic threshold calculation includes that the fixed maximum number (or ratio) may be kept as small as possible to limit false positive matches while maintaining an acceptable level of true positive matches for the user.

As the number of face signatures grows that are linked to known people in the local face database, the accuracy of the invention may increase in detecting known people automatically in future photos that are processed. This is a novel feature of this system.

The invention may learn a face by determining the closest match for a previously identified face from the group of known persons. An advantage of the present invention is that as the number of face signatures linked to known persons in the local face database grows, the accuracy of the invention may increase in detecting known persons automatically in future photos that are processed.

Video Scanning

Figure 20:
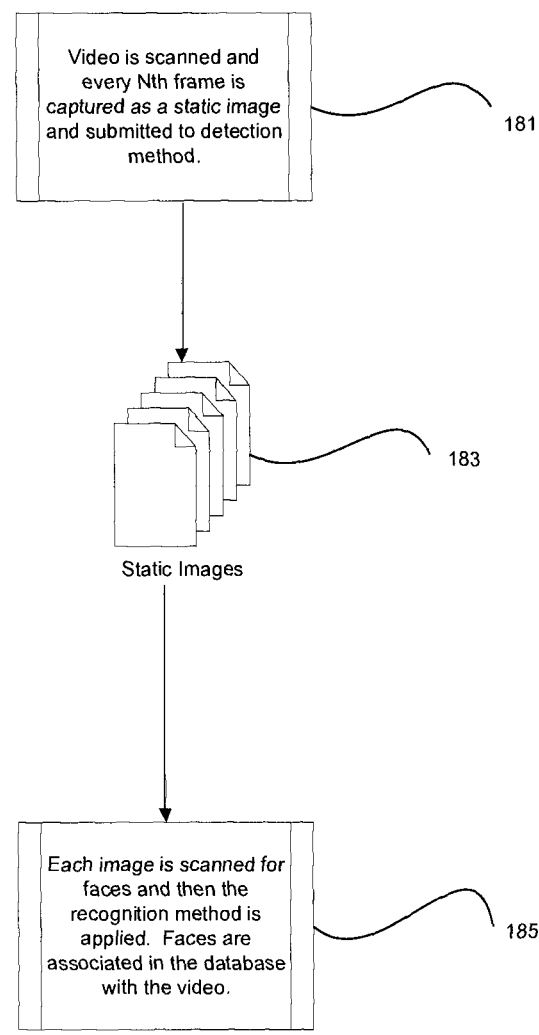
FIG. 20 illustrates a video scanning method whereby frames of video are extracted and face detection is performed on these frames.

FIG. 20 illustrates a video scanning method whereby frames of video are extracted and face detection is performed on these frames. A number N may be set (where N is adjustable) such that video may be scanned every N frames (181) of the video as individual photo images (183) where the previously mentioned techniques (185) would be applied to detect and recognize faces and known persons. The video could then be disseminated in accordance with the techniques provided herein.

The invention claimed is:

1. A method for recognizing one or more faces in a digital image, the method comprising:
   a. generating one or more face coordinates corresponding to one or more candidate regions for one or more candidate faces, the face coordinates generating comprising:
      initiating a first texture-based detection routine on the digital image to detect one or more candidate face regions, each candidate face region defined by respective face coordinates;
      applying a skin color detection test to the one or more candidate face regions to eliminate one or more of the candidate faces that fail the skin color detection test, if any;
      reducing the size defined by the face coordinates of the of the one or more candidate face regions to a predefined size;
      initiating a second texture-based detection routine on each size-reduced candidate face region to define a set of positively identified face objects and uncertain face objects; and
      defining further positively identified face objects, if any, by rotating the digital images associated with the uncertain face objects;
   b. generating eye coordinates based on the face coordinates of each positively identified face object;
   c. detecting each face using one or more projection images defined by the face coordinates of each positively identified face object and the eye coordinates; and
   d. comparing each projection image with one or more known projection images, wherein a similarity threshold is provided for defining a best match between the projection image and the known projection images.

2. The method claimed in claim 1 further characterized by, if the digital image is a color image: a. detecting in the digital image, the ratio of skin color to non-skin color; and b. if the ratio exceeds a threshold, determining that the digital image does not consist of a face.

3. The method claimed in claim 1 further characterized by rotating each image bounded by the eye coordinates to correspond to the rotation of the uncertain face objects.

4. The method claimed in claim 1 further characterized by: a. cropping an eye image corresponding to the portion of the digital image bounded by each eye coordinates; b. optionally resizing the eye image to a predetermined size; c. reducing reflected light in the eye image; and d. isolating a plurality of pupils in the eye image corresponding to dark locations of the eye image.

5. The method claimed in claim 1 further characterized in that the projection image is generated by: a. translating, rotating, and scaling the candidate region to a normalized image having a predetermined size wherein the eye coordinates are linked to predetermined locations; b. masking the normalized image to define a masked image wherein the face is isolated; c. applying a histogram equalization to a greyscale depiction of the masked image; and d. generating a principal component analysis ("PCA") vector of the equalized image.

6. The method of claim 1 wherein the rotating comprises:
performing a first rotation on each uncertain face object;
re-applying the face generating on the respective uncertain face object rotated by the first rotation;
performing a second rotation on each uncertain face object;
re-applying the face generating on the respective uncertain face object rotated by the second rotation; and
defining the positively identified face objects where a face is detected in the respective uncertain face object by both re-applications of the face generating.

7. The method of claim 6 wherein the first rotation comprises a first rotation angle, and the second rotation comprises a second rotation angle incremented with respect to the first rotation angle, the method comprising repeating the first rotation performing, second rotation performing, both face generating re-applying, and further positively identified face objects defining over a predetermined range of first rotation angles and second rotation angles.

8. The method of claim 1 comprising flattening each positively identified face object and applying a two-dimensional linear regression on pixel intensity in the respective face region for ensuring spatial uniformity of pixel intensity.

9. The method of claim 1 comprising applying a histogram image equalization in the greyscale domain to each positively identified face object.

10. The method of claim 1 comprising creating a principal component analysis ("PCA") vector of each positively identified face object; the projection image comparing comprising comparing the PCA vector of each positively identified face object with one or more PCA vectors associated with one or more known projection images, wherein the similarity threshold defines a best match between the PCA vector of the respective positively identified face object and the PCA vectors associated with the known projection images.

* * * * *